US012732995B2

(12) United States Patent
Si et al.

(10) Patent No.: US 12,732,995 B2
(45) Date of Patent: Sep. 8, 2026

(54) INFORMATION RECEIVING METHOD, INFORMATION SENDING METHOD, AND DEVICES

(71) Applicant: DATANG MOBILE COMMUNICATIONS EQUIPMENT CO., LTD., Beijing (CN)

(72) Inventors: Qianqian Si, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 1006 days.

(21) Appl. No.: 17/798,030

(22) PCT Filed: Jan. 15, 2021

(86) PCT No.: PCT/CN2021/072153
§ 371 (c)(1),
(2) Date: Aug. 5, 2022

(87) PCT Pub. No.: WO2021/164482
PCT Pub. Date: Aug. 26, 2021

(65) Prior Publication Data

US 2023/0076459 A1 Mar. 9, 2023

(30) Foreign Application Priority Data

Feb. 20, 2020 (CN) ......................... 202010105068.1
Apr. 10, 2020 (CN) ........................ 202010278946.X

(51) Int. Cl.
*H04W 72/1273* (2023.01)
*H04L 1/1812* (2023.01)
*H04L 5/00* (2006.01)

(52) U.S. Cl.
CPC ....... *H04W 72/1273* (2013.01); *H04L 1/1812* (2013.01); *H04L 5/0053* (2013.01)

(58) Field of Classification Search
CPC . H04W 72/1273; H04L 1/1812; H04L 5/0053
(Continued)

(56) References Cited

U.S. PATENT DOCUMENTS 12,598,589 B2 * 4/2026 Bai ....................... H04L 5/0053
2013/0182679 A1 * 7/2013 Seo ....................... H04L 5/0053
370/330

(Continued)

FOREIGN PATENT DOCUMENTS

AU 2013397787 A1 * 3/2016 ............ H04W 72/23
CN 106301702 A * 1/2017 ............... H04L 5/14

(Continued)

OTHER PUBLICATIONS

"Remaining Issues on DL SPS enhancement," 3GPP TSG RAN WG1 Meeting #100, R1-2000533, e-meeting, Feb. 24-Mar. 6, 2020, Source: CATT, Agenda Item: 7.2.5.7, all pages. Retrieved: Feb. 15, 2020. (Year: 2020).*

(Continued)

*Primary Examiner* — Asad M Nawaz
(74) *Attorney, Agent, or Firm* — Ladas & Parry, LLP

(57) ABSTRACT

An information receiving method, an information sending method and devices are disclosed. The information receiving method includes: in case that the user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot; and, for the multiple SPS PDSCHs (Continued)

determining, according to SPS configuration indexes of SPS PDSCHs and time domain positions of the SPS PDSCHs, some SPS PDSCHs whose time domain positions do not overlap, from the multiple SPS PDSCHs in the first slot

51 for the multiple SPS PDSCHs in the first slot, sending only the some SPS PDSCHs to the user equipment.

52 in the first slot, decoding, by the user equipment, only the some SPS PDSCHs of the multiple SPS PDSCHs.

12 Claims, 5 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0132092 | A1* | 5/2019 | Chen | H04L 1/1812 |
| 2019/0268803 | A1 | 8/2019 | He et al. | |
| 2021/0218504 | A1* | 7/2021 | Wang | H04L 1/1812 |
| 2022/0174659 | A1* | 6/2022 | Lu | H04L 5/0058 |

FOREIGN PATENT DOCUMENTS

| | | | | |
|---|---|---|---|---|
| CN | 110351018 | A | 10/2019 | |
| CN | 110662304 | A | 1/2020 | |
| EP | 2549820 | A2 * | 1/2013 | H04W 72/04 |
| EP | 4017179 | A1 | 6/2022 | |
| WO | WO-2021260604 | A1 * | 12/2021 | H04L 5/0044 |

OTHER PUBLICATIONS

International Search Report for PCT/CN2021/072153 issued on Apr. 2, 2021, and its English Translation provided by WIPO.
Written Opinion for PCT/CN2021/072153 issued on Apr. 2, 2021, and its English Translation provided by WIPO.
International Preliminary Report on Patentability for PCT/CN2021/072153 issued on Aug. 23, 2022 and its English Translation provided by WIPO.
"Chairman's notes of AI 7.2.6 Physical Layer Enhancements for NR URLLC," 3GPP TSG RAN WG1 Meeting #99, R1-1913577, Reno, USA, Nov. 18-22, 2019. Source: Ad-hoc Chair (Samsung), all pages.
"Outcome of email thread [100e-NR-L1enh_URLLC-SPS_enh-01]," 3GPP TSG RAN WG1 #100, R1-2001382, e-Meeting, Feb. 24-Mar. 6, 2020, Agenda Item: 7.2.5.7, Source: LG Electronics, all pages.
First Office Action for Chinese Patent Application 202010278946.X issued on Apr. 22, 2022, and its English translation provided by Global Dossier.
Office Action issued on Jun. 26, 2024 for Korean Patent Application No. 10-2022-7031319 and its English translation from KIPO.
Spreadtrum Communications; "Discussion on DL SPS enhancements for URLLC"; 3GPP TSG RAN WG1 Meeting #98, R1-1908945; Prague, CZ, Aug. 26-30, 2019.
Office Action from South Korean Patent Application No. 10-2022-7031319 dated Feb. 26, 2025 and its English translation.
Huawei et al, R1-2001106, corrections on other aspects for URLLC/IIOT enhancements, 3GPP TSG RAN WG1 #100, 3GPP server publication date (Feb. 15, 2020), Feb. 24-Mar. 6, 2020.
First Japanese Office Action for Japanese Patent Application No. 2022-550144 issued by the Japanese Patent Office on Sep. 12, 2023 and it's English Translation provided by the foreign associate.
"Remaining issues for DL SPS and PHR," 3GPP TSG RAN WG1 #100_e, R1-2000631, e-Meeting, Feb. 24-Mar. 6, 2020, Agenda Item: 7.2.5.7, Source:Samsung, all pages.
Extended European Search Report for the corresponding European Patent Application No. 21757204.9 issued on May 15, 2023 by the European Patent Office.
"Discussion on DL SPS," 3GPP TSG RAN WG1 #97, R1-1906961, Reno, USA, May 13-17, 2019, Agenda Item: 7.2.6.7, Source: Samsung, all pages.
"IIoT WI: Resource conflicts between UL grants, HARQ-ACK," 3GPP TSG RAN WG1 Meeting #98bis, R1-1910870, Chongqing, China, Oct. 14-20, 2019, Agenda Item: 7.2.6.7, Source: Nokia, Nokia Shanghai Bell, all pages.
"Remaining issues on DL SPS enhancement," 3GPP TSG RAN WG1 Meeting #100, R1-2000533, e-meeting, Feb. 24-Mar. 6, 2020, Source: CATT, Agenda Item: 7.2.5.7, all pages.

* cited by examiner

1

3

2

4

One slot determining, according to SPS configuration indexes of SPS PDSCHs and time domain positions of the SPS PDSCHs, some SPS PDSCHs whose time domain positions do not overlap, from the multiple SPS PDSCHs in the first slot

51 for the multiple SPS PDSCHs in the first slot, sending only the some SPS PDSCHs to the user equipment.

52

INFORMATION RECEIVING METHOD, INFORMATION SENDING METHOD, AND DEVICES

CROSS-REFERENCE TO RELATED APPLICATIONS

This application is the U.S. national phase of PCT Application PCT/CN2021/072153 filed on Jan. 15, 2021, which claims the priority of Chinese Application No. 202010105068.1, filed on Feb. 20, 2020, and the priority of Chinese Application No. 202010278946.X, filed on Apr. 10, 2020, the disclosures of which are incorporated in their entireties by reference herein.

TECHNICAL FIELD

The present disclosure relates to the field of communication technologies, and in particular to an information receiving method, an information sending method and devices.

BACKGROUND

In the current NR communication system, semi-static hybrid automatic repeat request acknowledgement (HARQ-ACK) codebook and dynamic HARQ-ACK codebook are supported for HARQ-ACK feedback.

When a user equipment (UE) is configured to use the semi-static HARQ-ACK codebook, the UE first determines, for each carrier, a set MA,c of PDSCH opportunities that need to feed back HARQ-ACK in one slot, according to HARQ-ACK feedback timing (K1), semi-static slot structure (if configured) and physical downlink shared channel (PDSCH) candidate time-domain resource allocation information. Then, according to the set MA,c, HARQ-ACK for PDSCH received in the set of PDSCH opportunities is mapped to corresponding positions in an HARQ-ACK feedback sequence, thereby obtaining an HARQ-ACK codebook transmitted in a slot n. Specifically, the UE first determines the number of downlink (DL) slots that need to be fed back in one uplink (UL) slot on a carrier, according to HARQ feedback timing configured by a high-level signaling. Then, among these DL slots, the UE determines the maximum number of PDSCHs that can be transmitted in each DL slot according to the PDSCH candidate time-domain resource allocation information. In case that a semi-static slot structure is configured, based on the slot structure, a candidate PDSCH that does not meet PDSCH transmission conditions needs to be removed. When there is carrier aggregation, the HARQ-ACK codebook of each carrier needs to be determined according to the above process, and finally the HARQ-ACK codebooks of different carriers are concatenated in order of carriers to obtain a final HARQ-ACK codebook.

When the UE is configured to use the dynamic HARQ-ACK codebook, based on counter-data assignment indication (C-DAI) and total DAI (T-DAI) indicated by downlink control information (DCI), the UE determines a sequence of bits and a total number of bits for feedback. The UE determines a physical downlink control channel (PDCCH) monitoring occasion set, according to a pre-configured HARQ-ACK feedback timing candidate set and a scheduling timing candidate set, and assumes that the C-DAI and T-DAI in the DCI are set based on the PDCCH monitoring occasion set. The C-DAI indicates, in the order of frequency domain first and then time domain, transmitted PDCCH index for scheduling PDSCH or for indicating semi-persistent scheduling (SPS) PDSCH release, up to a current PDCCH monitoring occasion on a current carrier. The T-DAI indicates a total number of transmitted PDCCHs for scheduling PDSCH or for indicating SPS PDSCH release, up to a current PDCCH monitoring occasion set. The T-DAI in the same PDCCH monitoring occasion on multiple carriers is the same. If any carrier is configured for code block group (CBG)-based data transmission, two sub-codebooks are generated. That is, a first sub-codebook is for transport block (TB)-based PDSCH transmission or for TB-based PDCCH for indicating SPS PDSCH release; and a second sub-codebook is for CBG-based PDSCH transmission. The two sub-codebooks are concatenated together in the order of the TB sub-codebook and the CBG sub-codebook, thereby forming a final HARQ-ACK code book. If multiple carriers are configured for CBG-based transmission and the numbers of configured CBGs are different, a CBG sub-codebook is generated based on the largest number of CBGs.

The Rel-16 supports simultaneous configuration of multiple SPS configurations within a carrier group, and there may be overlapping SPS PDSCHs on one carrier, and the protocol stipulates that the UE only demodulates the SPS PDSCH with the smallest SPS configuration index, among the overlapping SPS PDSCHs. When generating an HARQ-ACK codebook, there are following cases.

1) If the HARQ-ACK codebook includes only feedback information of the SPS PDSCH, the UE first finds all slots that have SPS PDSCH transmission and need to be fed back in a current physical uplink control channel (PUCCH) from slots corresponding to PUCCHs, according to HARQ-ACK feedback timing (K1). For each SPS configuration, 1-bit feedback information is generated for it in case that SPS PDSCH transmission is received in all the found slots. When there are multiple SPS configurations, the feedback information corresponding to each SPS configuration is concatenated according to SPS configuration indexes to obtain a HARQ-ACK codebook of one carrier. When there is carrier aggregation, a HARQ-ACK codebook of each carrier needs to be determined according to the foregoing process, respectively, and finally HARQ-ACK codebooks of different carriers are concatenated according to orders of carriers, thereby obtaining a final HARQ-ACK codebook.

2) If the HARQ-ACK codebook includes not only feedback information of SPS PDSCH, but also feedback information corresponding to dynamically scheduled PDSCH or DCI for indicating SPS PDSCH release, when configuring a semi-static HARQ-ACK codebook, an HARQ-ACK codebook is generated according to the above determination process of the semi-static HARQ-ACK codebook; when configuring a dynamic HARQ-ACK codebook, feedback information is generated for the dynamically scheduled PDSCH according to the above dynamic HARQ-ACK codebook, and feedback information is generated for the SPS PDSCH according to the above situation where the HARQ-ACK codebook includes only feedback information of the SPS PDSCH; and then the two pieces of feedback information are concatenated, thereby obtaining an HARQ-ACK codebook.

In the related art, for the case where multiple SPS PDSCHs overlap, the current protocol stipulates that the UE only demodulates the SPS PDSCH with the smallest SPS configuration index, among the overlapping SPS PDSCHs. If there is no direct overlapping relationship between some SPS PDSCHs in the multiple overlapping SPS PDSCHs, it is currently unclear whether multiple non-overlapping SPS PDSCHs can be transmitted, and there is no specific scheme to determine how to handle other non-overlapping SPS PDSCHs among multiple overlapping SPS PDSCHs.

SUMMARY

According to a first aspect, the present disclosure provides an information receiving method, performed by a user equipment (UE), including:

in case that multiple SPS PDSCHs are configured in a first slot, determining, according to an SPS configuration index of each of the multiple SPS PDSCHs and a time domain position of each of the multiple SPS PDSCHs, some SPS PDSCHs whose time domain positions do not overlap in the first slot; and decoding, by the user equipment, the some SPS PDSCHs.

In conjunction with the first aspect, in some implementations of the first aspect, the method further includes: in case that the user equipment is configured to use a dynamic HARQ-ACK codebook, or an HARQ-ACK codebook of the user equipment includes only feedback information of the SPS PDSCH correspond to an HARQ-ACK codebook, when it is determined to perform, in a feedback slot, HARQ-ACK feedback for the multiple SPS PDSCHs, generating HARQ-ACK feedback information according to the some SPS PDSCHs; and sending, in the feedback slot, an HARQ-ACK codebook including the HARQ-ACK feedback information corresponding to the some SPS PDSCHs.

In conjunction with the first aspect, in some implementations of the first aspect, the generating HARQ-ACK feedback information according to the some SPS PDSCHs, includes:

generating HARQ-ACK feedback information for each SPS PDSCH in the some SPS PDSCHs;

or, determining SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, generating HARQ-ACK feedback information for each determined SPS PDSCH.

In conjunction with the first aspect, in some implementations of the first aspect, the determining, by the user equipment, whether to perform, in the feedback slot, HARQ-ACK feedback for the multiple SPS PDSCHs, includes:

determining candidate slots corresponding to the feedback slot, according to a feedback slot interval set between PDSCH and HARQ-ACK configured for the user equipment;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether to perform, in the feedback slot, HARQ-ACK feedback for the multiple SPS PDSCHs.

In conjunction with the first aspect, in some implementations of the first aspect, the some SPS PDSCHs at least include: an SPS PDSCH with a smallest SPS configuration index among the multiple SPS PDSCHs.

In conjunction with the first aspect, in some implementations of the first aspect, the determining, according to an SPS configuration index of each of the multiple SPS PDSCHs and a time domain position of each of the multiple SPS PDSCHs, some SPS PDSCHs whose time domain positions do not overlap in the first slot, includes:

taking the multiple SPS PDSCHs as a first set, or taking SPS PDSCHs that do not conflict with semi-statically configured uplink symbols, among the multiple SPS PDSCHs, as a first set; and initializing an empty second set;

performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap;

adding remaining SPS PDSCHs in the first set to the second set, and taking SPS PDSCHs in the second set as the some SPS PDSCHs.

In conjunction with the first aspect, in some implementations of the first aspect, the determining, according to an SPS configuration index of each of the multiple SPS PDSCHs and a time domain position of each of the multiple SPS PDSCHs, some SPS PDSCHs whose time domain positions do not overlap, includes:

taking the multiple SPS PDSCHs as a first set, or taking SPS PDSCHs that do not conflict with semi-statically configured uplink symbols, among the multiple SPS PDSCHs, as a first set; and initializing an empty third set;

performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap;

grouping each of remaining SPS PDSCHs in the updated first set into a group, and sorting each group in an ascending order of a smallest SPS configuration index in each group;

according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set;

taking SPS PDSCHs in the third set as the some SPS PDSCHs.

In conjunction with the first aspect, in some implementations of the first aspect, the time domain position of the SPS PDSCH is determined according to a start and length indication value (SLIV) of the SPS PDSCH.

According to a second aspect, the present disclosure provides an information sending method, performed by a base station, including:

in case that multiple SPS PDSCHs are configured for a user equipment in a first slot, determining, according to an SPS configuration index of each of the multiple SPS PDSCHs and a time domain position of each of the multiple SPS PDSCHs, some SPS PDSCHs whose time domain positions do not overlap in the first slot;

sending the some SPS PDSCHs to the user equipment.

In conjunction with the second aspect, in some implementations of the second aspect, the method further includes: in case that the user equipment is configured to use a dynamic HARQ-ACK codebook, or an HARQ-ACK codebook of the user equipment includes only feedback information of the SPS PDSCH correspond to an HARQ-ACK codebook, when it is determined that the user equipment performs, in a feedback slot, HARQ-ACK feedback for multiple SPS PDSCHs, determining HARQ-ACK feedback information according to the some SPS PDSCHs;

receiving an HARQ-ACK codebook sent by the user equipment in the feedback slot, according to the HARQ-ACK feedback information corresponding to the some SPS PDSCHs.

In conjunction with the second aspect, in some implementations of the second aspect, the determining HARQ-ACK feedback information according to the some SPS PDSCHs, includes:

determining feedback information for each SPS PDSCH in the some SPS PDSCHs as the HARQ-ACK feedback information;

or, determining target SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, determining feedback information for each SPS PDSCH in the target SPS PDSCHs as the HARQ-ACK feedback information.

In conjunction with the second aspect, in some implementations of the second aspect, the determining, by the base station, whether the user equipment performs, in the feedback slot, HARQ-ACK feedback for multiple SPS PDSCHs, includes:

determining candidate slots corresponding to the feedback slot, according to a feedback slot interval set between PDSCH and HARQ-ACK configured for the user equipment;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether the user equipment performs, in the feedback slot, HARQ-ACK feedback for the multiple SPS PDSCHs.

In conjunction with the second aspect, in some implementations of the second aspect, the some SPS PDSCHs at least include: an SPS PDSCH with a smallest SPS configuration index among the multiple SPS PDSCHs.

In conjunction with the second aspect, in some implementations of the second aspect, the determining, according to an SPS configuration index of each of the multiple SPS PDSCHs and a time domain position of each of the multiple SPS PDSCHs, some SPS PDSCHs whose time domain positions do not overlap in the first slot, includes:

taking the multiple SPS PDSCHs as a first set, or taking SPS PDSCHs that do not conflict with semi-statically configured uplink symbols, among the multiple SPS PDSCHs, as a first set; and initializing an empty second set;

performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap;

adding remaining SPS PDSCHs in the first set to the second set, and taking SPS PDSCHs in the second set as the some SPS PDSCHs.

In conjunction with the second aspect, in some implementations of the second aspect, the determining, according to an SPS configuration index of each of the multiple SPS PDSCHs and a time domain position of each of the multiple SPS PDSCHs, some SPS PDSCHs whose time domain positions do not overlap in the first slot, includes:

taking the multiple SPS PDSCHs as a first set, or taking SPS PDSCHs that do not conflict with semi-statically configured uplink symbols, among the multiple SPS PDSCHs, as a first set; and initializing an empty third set;

performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap;

grouping each of remaining SPS PDSCHs in the updated first set into a group, and sorting each group in an ascending order of a smallest SPS configuration index in each group;

according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set;

taking SPS PDSCHs in the third set as the some SPS PDSCHs.

In conjunction with the second aspect, in some implementations of the second aspect, the time domain position of the SPS PDSCH is determined according to a start and length indication value (SLIV) of the SPS PDSCH.

According to a third aspect, the present disclosure provides an information receiving device applied to a user equipment, including:

a determining module configured to, in case that multiple SPS PDSCHs are configured in a first slot, determine, according to an SPS configuration index of each of the multiple SPS PDSCHs and a time domain position of each of the multiple SPS PDSCHs, some SPS PDSCHs whose time domain positions do not overlap in the first slot;

a receiving module configured to, decode the some SPS PDSCHs.

In conjunction with the third aspect, in some implementations of the third aspect, the information receiving device further includes:

a generating module configured to, in case that the user equipment is configured to use a dynamic HARQ-ACK codebook, or an HARQ-ACK codebook of the user equipment includes only feedback information of the SPS PDSCH correspond to an HARQ-ACK codebook, when it is determined to perform, in a feedback slot, HARQ-ACK feedback for multiple SPS PDSCHs, generate HARQ-ACK feedback information according to the some SPS PDSCHs;

a sending module configured to send, in the feedback slot, an HARQ-ACK codebook including the HARQ-ACK feedback information corresponding to the some SPS PDSCHs.

According to a fourth aspect, the present disclosure provides a user equipment, including: a memory, a processor, a transceiver, and a program stored on the memory and executable by the processor; wherein the processor executes the program to implements:

in case that multiple SPS PDSCHs are configured in a first slot, determining, according to an SPS configuration index of each of the multiple SPS PDSCHs and a time domain position of each of the multiple SPS PDSCHs, some SPS PDSCHs whose time domain positions do not overlap in the first slot;

decoding, by the user equipment user equipment, the some SPS PDSCHs.

In conjunction with the fourth aspect, in some implementations of the fourth aspect, the processor executes the program to implements:

in case that the user equipment is configured to use a dynamic HARQ-ACK codebook, or an HARQ-ACK codebook of the user equipment includes only feedback information of the SPS PDSCH correspond to an HARQ-ACK codebook, when it is determined to perform, in a feedback slot, HARQ-ACK feedback for the multiple SPS PDSCHs, generating HARQ-ACK feedback information according to the some SPS PDSCHs; and sending, in the feedback slot, an HARQ-ACK codebook including the HARQ-ACK feedback information corresponding to the some SPS PDSCHs.

In conjunction with the fourth aspect, in some implementations of the fourth aspect, the processor executes the program to implements:

when determining, according to an SPS configuration index of each of the multiple SPS PDSCHs and a time domain position of each of the multiple SPS PDSCHs, some SPS PDSCHs whose time domain positions do not overlap in the first slot, taking the multiple SPS PDSCHs as a first set, or taking SPS PDSCHs that do not conflict with semi-statically configured uplink symbols, among the multiple SPS PDSCHs, as a first set; and initializing an empty second set;

performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap;

adding remaining SPS PDSCHs in the first set to the second set, and taking SPS PDSCHs in the second set as the some SPS PDSCHs.

In conjunction with the fourth aspect, in some implementations of the fourth aspect, the processor executes the program to implements:

when determining, according to an SPS configuration index of each the multiple SPS PDSCHs and a time domain position of each of the multiple SPS PDSCHs, some SPS PDSCHs whose time domain positions do not overlap in the first slot, taking the multiple SPS PDSCHs as a first set, or taking SPS PDSCHs that do not conflict with semi-statically configured uplink symbols, among the multiple SPS PDSCHs, as a first set; and initializing an empty third set;

performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap;

grouping each of remaining SPS PDSCHs in the updated first set into a group, and sorting each group in an ascending order of a smallest SPS configuration index in each group;

according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set;

taking SPS PDSCHs in the third set as the some SPS PDSCHs.

According to a fifth aspect, the present disclosure provides an information sending device applied to a base station, including:

a first determining module configured to, in case that multiple SPS PDSCHs are configured for a user equipment in a first slot, determine, according to an SPS configuration index of each of the multiple SPS PDSCHs and a time domain position of each of the multiple SPS PDSCHs, some SPS PDSCHs whose time domain positions do not overlap in the first slot;

a sending module configured to, send the some SPS PDSCHs to the user equipment.

In conjunction with the fifth aspect, in some implementations of the fourth aspect, the information sending device further includes:

a second determining module configured to, in case that the user equipment is configured to use a dynamic HARQ-ACK codebook, or an HARQ-ACK codebook of the user equipment user equipment includes only includes feedback information of the SPS PDSCH correspond to an HARQ-ACK codebook, when determining that the user equipment performs, in a feedback slot, HARQ-ACK feedback for multiple SPS PDSCHs, determine HARQ-ACK feedback information according to the some SPS PDSCHs;

a receiving module configured to receive an HARQ-ACK codebook sent by the user equipment in the feedback slot, according to the HARQ-ACK feedback information corresponding to the some SPS PDSCHs.

According to a sixth aspect, the present disclosure provides a base station, including: a memory, a processor, a transceiver, and a program stored on the memory and executable by the processor; wherein the processor executes the program to implements:

in case that multiple SPS PDSCHs are configured for a user equipment in a first slot, determining, according to an SPS configuration index of each of the multiple SPS PDSCHs and a time domain position of each of the multiple SPS PDSCHs, some SPS PDSCHs whose time domain positions do not overlap in the first slot;

sending the some SPS PDSCHs to the user equipment.

In conjunction with the sixth aspect, in some implementations of the sixth aspect, the processor executes the program to implements:

in case that the user equipment is configured to use a dynamic HARQ-ACK codebook, or an HARQ-ACK codebook of the user equipment includes only feedback information of the SPS PDSCH correspond to an HARQ-ACK codebook, when it is determined that the user equipment performs, in a feedback slot, HARQ-ACK feedback for multiple SPS PDSCH, determining HARQ-ACK feedback information according to the some SPS PDSCHs;

receiving an HARQ-ACK codebook sent by the user equipment in the feedback slot, according to the HARQ-ACK feedback information corresponding to the some SPS PDSCHs.

According to a seventh aspect, the present disclosure provides a computer storage medium, including instructions, wherein the instructions are executed by a computer to perform the information receiving method according to the first aspect, or to perform the information sending method according to the second aspect.

BRIEF DESCRIPTION OF THE DRAWINGS

By reading the following detailed description of optional embodiments, various other advantages and benefits will become clear to those of ordinary skill in the art. The drawings are only used for the purpose of showing optional embodiments, and are not considered as a limitation to the present disclosure. Further, throughout the drawings, the same reference symbol is used to denote the same component. In the attached drawing.

DETAILED DESCRIPTION

Figures 1, 2:
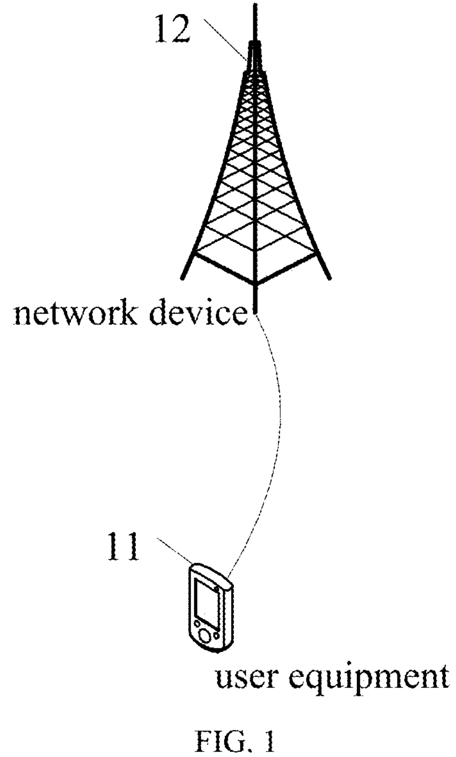
FIG. 1 is a schematic diagram of a wireless communication system to which an embodiment of the present disclosure can be applied.
FIG. 2 is a schematic diagram showing an example of multiple overlapping SPS PDSCHs according to an embodiment of the present disclosure.

Exemplary embodiments of the present disclosure will be described hereinafter in details with reference to the accompanying drawings. Although the drawings show exemplary embodiments of the present disclosure, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

Such words as "first" and "second" used in the specification and claims of the present disclosure are merely used to differentiate similar objects rather than to represent a specific sequence or order. It should be understood that data used in this way may be interchanged under appropriate circumstances, so that the embodiments of the present disclosure described herein, for example, may be implemented in an order other than those illustrated or described herein. Similarly, such words as "include" or "including" and any variations thereof are intended to cover non-exclusive inclusions. For example, a process, method, system, product or device that includes a series of steps or units, is not necessarily limited to those clearly listed steps or units, and may include other steps or units that are not clearly listed or are inherent to the process, method, product or device. In the specification and claims, "and/or" means at least one of connected objects.

The technology described herein is not limited to long time evolution (LTE), LTE-advanced (LTE-A) system and 5GNR system, and can also be applied to various other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA) and new communication systems that will appear in the future. The terms "system" and "network" are often used interchangeably. The CDMA system can implement radio technologies such as CDMA2000 and universal terrestrial radio access (UTRA). The UTRA includes wideband code division multiple access (WCDMA) and other CDMA variants. The TDMA system can implement radio technologies such as global system for mobile communication (GSM). The OFDMA system can implement radio technologies such as ultra-mobile broadband (UMB), evolution-UTRA (E-UTRA), IEEE802.21 (Wi-Fi), IEEE802.16 (WiMAX), IEEE802.20, flash-OFDM. The UTRA and E-UTRA are parts of universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd generation partnership project" (3GPP). CDMA2000 and UMB are described in documents from an organization named "3rd generation partnership project 2" (3GPP2). The techniques described herein can be applied for the systems and radio technologies mentioned above, as well as other systems and radio technologies. However, the following description describes the NR system for exemplary purposes, and NR terminologies are used in most of the following description, although these techniques can also be applied to applications other than NR system applications.

The following description provides examples and does not limit the scope, applicability, or configuration set forth in the claims. Changes may be made to function and arrangement of discussed elements without departing from the spirit and scope of the present disclosure. Various examples may omit, substitute, or add various procedures or components as appropriate. For example, the described method may be performed in an order different from that described, and various steps can be added, omitted or combined. In addition, features described with reference to certain examples may be combined in other examples.

Referring to FIG. 1, FIG. 1 is a block diagram of a wireless communication system to which an embodiment of the present disclosure can be applied. The wireless communication system includes a terminal 11 and a network device 12. The terminal 11 may also be referred to as a user terminal or user equipment (UE). The terminal 11 may be a terminal-side device such as a mobile phone, a tablet personal computer, a laptop computer, a personal digital assistant (PDA), a mobile internet device (MID), a wearable device or in-vehicle device. It should be noted that the specific type of the terminal 11 is not limited in the embodiment of the present disclosure. The network device 12 may be a base station and/or a core network element. The above base station may be a base station of 5G and later versions (e.g., gNB, 5G NR NB, etc.), or a base station in other communication systems (e.g., eNB, WLAN access point, or other access point, etc.). The base station may be referred as Node B, evolved Node B, access point, base transceiver station (BTS), radio base station, radio transceiver, basic service set (BSS), extended service set (ESS), Node B, evolved Node B (eNB), Home Node B, Home evolved Node B, WLAN access point, WiFi node, or some other suitable term in the field. As long as the same technical effect is achieved, the base station is not limited to specific technical vocabulary. It should be noted that in the embodiments of the present disclosure, only the base station in the NR system is taken as an example, but the specific type of the base station is not limited.

The base station may communicate with the terminal 11 under control of a base station controller. In various examples, the base station controller may be a part of a core network or one base station. Some base stations can communicate control information or user data with the core network through the backhaul. In some examples, some of these base stations may directly or indirectly communicate with each other through a backhaul link, which may be a wired or wireless communication link. The wireless communication system can support operations on multiple carriers (waveform signals of different frequencies). A multi-carrier transmitter can simultaneously transmit modulated signals on these multiple carriers. For example, each communication link may be a multi-carrier signal modulated according to various radio technologies. Each modulated signal may be sent on different carriers and may carry control information (for example, reference signals, control channels, etc.), overhead information, data, and so on.

The base station can wirelessly communicate with the terminal 11 via one or more access point antennas. Each base station can provide communication coverage for its corresponding coverage area. A coverage area of an access point can be divided into sectors that each form only a part of the coverage area. The wireless communication system may include different types of base stations (for example, a macro base station, a micro base station, or a pico base station). The base station may also utilize different radio technologies, such as cellular or WLAN radio access technologies. The base station may be associated with the same or different access networks or operator deployments. The coverage areas of different base stations (including coverage areas of base stations of the same or different types, coverage areas using the same or different radio technologies, or coverage areas belonging to the same or different access networks) may overlap.

The communication link in the wireless communication system may include an uplink for carrying uplink (UL) transmission (for example, from the terminal 11 to the network device 12), or a downlink for carrying downlink (DL) transmission (for example, from the network device 12 to the terminal 11). The UL transmission may also be referred to as reverse link transmission, and the DL transmission may also be referred to as forward link transmission. The DL transmission may be performed on licensed frequency bands, unlicensed frequency bands, or both. Similarly, the UL transmission may be performed on licensed frequency bands, unlicensed frequency bands, or both.

As described in the background, the NR system supports simultaneous configuration of multiple SPS configurations within a carrier group, and there may be overlapping SPS PDSCHs, and the current protocol stipulates that the UE only demodulates the SPS PDSCH with the smallest SPS configuration index, among the overlapping SPS PDSCHs. If there is no overlapping relationship between transmissions of some SPS PDSCHs in the multiple overlapping SPS PDSCHs, it is currently unclear whether multiple non-overlapping SPS PDSCHs can be transmitted, and there is no specific scheme to determine which of multiple overlapping SPS PDSCHs can be transmitted.

As shown in FIG. 2, each rectangular small square represents an SPS PDSCH, and the number x in the small square is used to indicate that the SPS PDSCH is an SPS PDSCH with an SPS configuration index x. In FIG. 2, there are 4 overlapping SPS PDSCHs in one slot, and the UE can demodulate an SPS PDSCH with the SPS configuration index 1. But there is no overlap between the SPS PDSCH with the SPS configuration index 1 and an SPS PDSCH with an SPS configuration index 3; and there is also no overlap between the SPS PDSCH with the SPS configuration index 1 and an SPS PDSCH with an SPS configuration index 4; and it is not clear whether the UE can demodulate the SPS PDSCH with the SPS configuration index 3 or the SPS PDSCH with the SPS configuration index 4.

In order to solve at least one of the above problems, at least one embodiment of the present disclosure provides an information receiving method applied to a UE. When there are multiple overlapping SPS PDSCHs, the method determines some SPS PDSCHs capable of being transmitted, from the multiple SPS PDSCHs, based on configuration indexes and time domain positions of the multiple SPS PDSCHs, so that SPS PDSCHs which do not have a direct overlapping relationship, among the multiple SPS PDSCHs, can be transmitted simultaneously. Here, the direct overlapping relationship means that there is overlap between time domain positions of the two SPS PDSCHs. In addition, this article may also involve the concept of an indirect overlapping relationship, and the indirect overlapping relationship means that time-domain positions of two SPS PDSCHs both overlap with a time-domain position of another SPS PDSCH. For example, time domain positions of a first SPS PDSCH and a third SPS PDSCH overlap, and time domain positions of a second SPS PDSCH and the third SPS PDSCH overlap; at this point, there is an indirect overlapping relationship between the first SPS PDSCH and the second SPS PDSCH.

Figures 3, 4, 5:
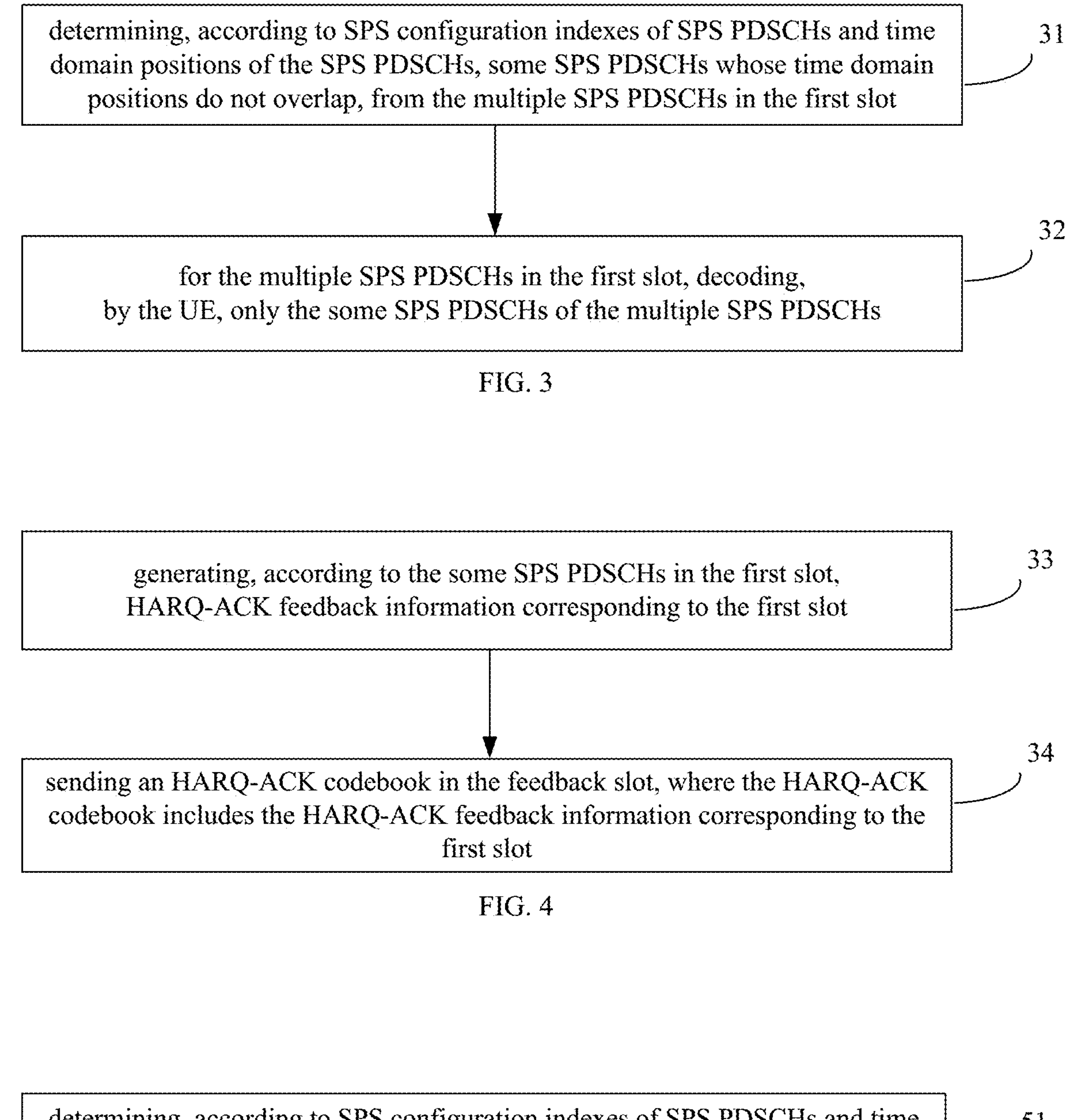
FIG. 3 is a flowchart of an information receiving method according to an embodiment of the present disclosure.
FIG. 4 is another flowchart of an information receiving method according to an embodiment of the present disclosure.
FIG. 5 is a flowchart of an information sending method according to an embodiment of the present disclosure.

As shown in FIG. 3, an information receiving method according to an embodiment of the present disclosure is performed by a user equipment and includes the following steps.

Step 31: in case that the user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot.

Here, the multiple SPS PDSCHs are SPS PDSCHs configured in the first slot among all activated SPS configurations of the UE, and time domain positions of these SPS PDSCHs overlap, which specifically, may be that the time domain positions of any two SPS PDSCHs in the multiple SPS PDSCHs overlap in the first slot.

According to at least one embodiment of the present disclosure, the some SPS PDSCHs may at least include: the SPS PDSCH with the smallest SPS configuration index among the multiple SPS PDSCHs. This can ensure that the SPS PDSCH with the smallest SPS configuration index among the multiple SPS PDSCHs can be preferentially used for transmission.

In addition, a time domain position of an SPS PDSCH is determined according to a start and length indication value (SLIV) of the SPS PDSCH. The SLIV indicates a specific start symbol of the SPS PDSCH, and several symbols of a symbol length starting from the start symbol, where these symbols are the time domain position corresponding to the SPS PDSCH.

Step 32: for the multiple SPS PDSCHs in the first slot, decoding, by the UE, only the some SPS PDSCHs of the multiple SPS PDSCHs.

Here, the UE may specifically receive the some SPS PDSCHs in the first slot, instead of receiving all of the multiple SPS PDSCHs, which can not only ensure transmission performance, but also improve reception efficiency.

Through the above steps, the embodiments of the present disclosure specify a transmission scheme when multiple SPS PDSCHs overlap, and ensure transmission and feedback performance of the communication system when the multiple SPS PDSCHs overlap.

The following provides two determination manners for determining some SPS PDSCHs whose time domain positions do not overlap, from the multiple SPS PDSCHs in the first slot.

The first determination manner a1) taking the multiple SPS PDSCHs as a first set, or taking SPS PDSCHs that do not conflict with semi-statically configured uplink symbols, among the multiple SPS PDSCHs, as a first set; and initializing an empty second set;

a2) repeating the following steps until the first set does not include SPS PDSCHs whose time domain positions overlap: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set;

a3) adding remaining SPS PDSCHs in the first set to the second set, and taking SPS PDSCHs in the second set as the some SPS PDSCHs.

The second determination manner b1) taking the multiple SPS PDSCHs as a first set, or taking SPS PDSCHs that do not conflict with semi-statically configured uplink symbols, among the multiple SPS PDSCHs, as a first set; and initializing an empty third set;

b2) repeating the following steps until the first set does not include SPS PDSCHs whose time domain positions overlap: determining a second SPS PDSCH with an earliest end symbol position from the first set, grouping SPS PDSCHs in the first set (including the second SPS PDSCH) whose start symbol positions are earlier than the end symbol position of the second SPS PDSCH into a group, and deleting the SPS PDSCHs in the group from the first set to obtain an updated first set;

b3) grouping each of remaining SPS PDSCHs in the updated first set into a group, and sorting each group in an ascending order of a smallest SPS configuration index in each group;

b4) according to an order of each group, sequentially adding a candidate SPS PDSCH with a smallest SPS configuration index in each group to the third set, where the candidate SPS PDSCH in each group is an SPS PDSCH in each group, which does not have overlapping time domain positions with current SPS PDSCHs in the third set;

b5) taking SPS PDSCHs in the third set as the some SPS PDSCHs.

Through the above manner, in the embodiments of the present disclosure, some (one or more than one) SPS PDSCHs can be selected from the multiple SPS PDSCHs in the first slot, and then the some SPS PDSCHs are decoded.

According to at least one embodiment of the present disclosure, in the above manner, the SPS PDSCH that does not conflict with semi-statically configured uplink symbols means that if all symbols of an SPS PDSCH do not overlap uplink symbols indicated by signaling tdd-UL-DL-ConfigurationCommon and tdd-UL-DL-ConfigurationDedicated, it is considered that the SPS PDSCH does not conflict with semi-statically configured uplink symbol.

In addition, according to at least one embodiment of the present disclosure, in the above manner, if the number of the selected some SPS PDSCHs exceeds the maximum receiving capability of the UE, based on the maximum receiving capability of the UE, N SPS PDSCHs with the smallest SPS configuration indexes may be selected from the some SPS PDSCHs for transmission, where N is the maximum number of unicast PDSCH transmissions received by the UE in one slot, and a value of N may be determined based on UE capability.

According to at least one embodiment of the present disclosure, after receiving the some SPS PDSCHs, the UE may further generate HARQ-ACK feedback information for the some SPS PDSCHs. Specifically, as shown in FIG. 4, after the foregoing step 32, the foregoing method further includes the following steps 33-34.

Step 33: in case that the UE is configured to use a dynamic HARQ-ACK codebook, or the HARQ-ACK codebook of the UE includes only an HARQ-ACK codebook including feedback information of the SPS PDSCH, when it is determined to perform, in a feedback slot, HARQ-ACK feedback for multiple SPS PDSCHs in the first slot, generating, by the UE, according to the some SPS PDSCHs in the first slot, HARQ-ACK feedback information corresponding to the first slot.

Here, when a dynamic codebook is used, the HARQ-ACK feedback information corresponding to the first slot includes feedback information of multiple SPS PDSCHs in the first slot, and may also include feedback information of dynamic PDSCH in the first slot. Here, only HARQ-ACK feedback for multiple SPS PDSCHs in the first slot is limited; and the feedback information of the dynamic PDSCH in the first slot is not specifically limited in embodiments of the present disclosure.

Here, whether it is necessary to perform, in the feedback slot, HARQ-ACK feedback for the multiple SPS PDSCHs in the first slot, may be determined in the following manner:

c1) determining candidate slots corresponding to the feedback slot, according to a feedback slot interval set (K1 set) between PDSCH and HARQ-ACK configured for the UE;

c2) selecting, from the candidate slots, target slots for which HARQ-ACK feedback needs to be performed in the feedback slot, according to whether there is at least one SPS PDSCH for which feedback needs to be performed in the feedback slot, in the candidate slots; for example, polling each candidate slot, and when there is at least one SPS PDSCH for which feedback needs to be performed in the feedback slot in a currently polled candidate slot, selecting this candidate slot as a target slot, until all candidate slots have been polled;

c3) according to whether the first slot belongs to the target slots, determining whether to perform, in the feedback slot, HARQ-ACK feedback for the multiple SPS PDSCHs in the first slot. For example, if the first slot belongs to the target slots, it is determined to perform, in the feedback slot, HARQ-ACK feedback for the multiple SPS PDSCHs in the first slot; otherwise, if the first slot does not belong to the target slots, it is determined to not perform, in the feedback slot, HARQ-ACK feedback for the multiple SPS PDSCHs in the first slot.

Step 34: sending an HARQ-ACK codebook in the feedback slot, where the HARQ-ACK codebook includes the HARQ-ACK feedback information corresponding to the first slot.

Here, the HARQ-ACK codebook may further include HARQ-ACK feedback information corresponding to other slots in addition to the first slot, which is not specifically limited in the embodiment of the present disclosure.

In addition, according to some embodiments of the present disclosure, when generating the HARQ-ACK feedback information corresponding to the first slot according to the some SPS PDSCHs in the first slot, the above step 33 includes: generating HARQ-ACK feedback information for each SPS PDSCH in the some SPS PDSCHs. At this point, feedback information is generated for each SPS PDSCH in the some SPS PDSCHs.

According to other embodiments of the present disclosure, when generating the HARQ-ACK feedback information corresponding to the first slot according to the some SPS PDSCHs in the first slot, the above step 33 includes: determining SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, generating HARQ-ACK feedback information for each determined SPS PDSCH. At this point, feedback information is generated for one or more SPS PDSCHs in the some SPS PDSCHs.

Through the above steps, the embodiments of the present disclosure provide a feedback scheme when multiple SPS PDSCHs overlap, and the feedback scheme can use the same manner as in the information receiving method shown in FIG. 3 to determine some SPS PDSCHs whose time domain positions do not overlap from the multiple SPS PDSCHs in the first slot. Of course, the some SPS PDSCHs determined above may also be directly used. Then, HARQ-ACK feedback is performed for these SPS PDSCHs. In this way, the embodiments of the present disclosure specify a feedback scheme when multiple SPS PDSCHs overlap, and ensure feedback performance of the communication system when the multiple SPS PDSCHs overlap.

Hereinafter, behaviors at the terminal side of some embodiments of the present disclosure will be described.

When there are multiple SPS PDSCHs whose time domain positions overlap in a slot, based on configuration indexes of the multiple SPS PDSCHs and transmission positions of the multiple SPS PDSCHs in the current slot, some SPS PDSCHs capable of being transmitted, can be determined from the multiple SPS PDSCHs, in the following two manners.

First manner: the principle is to preferentially determine that an SPS PDSCH with a smaller configuration index may be transmitted, and exclude an SPS PDSCH that overlaps with the SPS PDSCH with a smaller number. Specific steps are as follows.

Step s0: assuming that a set Y is an empty set;

Step s1: in a slot, finding an SLIV set Q corresponding to all SPS configurations that are active and configured for transmission in the current slot;

Step s2: selecting an SLIV with the smallest SPS configuration index in the set Q as a resource A, and adding the SLIV of the resource A to the set Y;

Step s3: removing all SLIVs that overlap with the resource A and the SLIV corresponding to the resource A, from the set Q;

Step s4: taking remaining resources as an updated set Q; if there are no overlapping resources in the updated set Q, proceeding the following step s5; otherwise, returning back to the step s2;

Step s5: adding remaining SLIVs in the updated set Q to the set Y, and determining SPS configurations corresponding to the SLIVs in the set Y, as SPS configurations capable of being transmitted in the current slot.

Second manner: the principle is to dividing all SLIVs of the multiple SPS PDSCHs into groups, and select, in each group, at most one SPS PDSCH with a smaller configuration index capable of being transmitted. Specific steps are as follows.

Step S1: in a slot, finding an SLIV set Q corresponding to all SPS configurations that are active and configured for transmission in the current slot.

Step S2: dividing SLIVs in the set Q into multiple groups, with a specific process which includes:

Step S2-1: taking an SLIV with an earliest end symbol position in the set Q as a resource A, and grouping all SLIVs in the set Q, with start symbol positions earlier than the end symbol position of the resource A into a group, which is taken as a group X;

Step S2-2: removing the SLIVs of the group X from the set Q, and taking remaining resources as an updated Q;

Step S2-3: if overlapped SLIVs are not included in the updated Q, ending the grouping and proceeding into the following step S3; otherwise, returning back to the step S2-1.

Step S3: finding an SLIV with a smallest SPS configuration index in each group, and sorting these groups based on an order of the SPS configuration index of the SLIV with the smallest SPS configuration index in each group.

Step S4: in a first group, selecting an SPS configuration corresponding to the SLIV with the smallest SPS configuration index, as a determined SPS configuration capable of being transmitted in a current slot.

Step S5: according to an order of the groups, successively judging whether there is, in each group, a SLIV that does not overlap with the SLIV corresponding to the SPS configuration that has been determined as capable of being transmitted; if there is, then proceeding to the following step S6; otherwise, determining that SPS configurations corresponding to all the SLIVs in the current group cannot be transmitted in the current slot.

Step S6: selecting an SPS configuration with a smallest index, from SPS configurations corresponding to SLIVs which are in the current group and do not overlap with the SLIV corresponding to the SPS configuration that has been determined as capable of being transmitted, as a determined SPS configuration capable of being transmitted in the current slot; and returning to the step S5, until all groups have been judged, thereby obtaining all SPS configurations capable of being transmitted in the current slot.

In addition, for an HARQ-ACK codebook only including feedback information of SPS PDSCH or a dynamic codebook, if it is determined that there are multiple SPS PDSCH overlapping in a corresponding PDSCH transmission slot according to a feedback slot interval K1 between PDSCH included in the some SPS PDSCHs and HARQ-ACK, and K1 of any SPS PDSCH indicates feedback in the current codebook, for the slot in which there are multiple overlapping SPS PDSCHs, feedback information is generated for SPS PDSCH transmission in the following manners.

Manner a): generating feedback information for some SPS PDSCHs which are determined as capable of being transmitted, among the multiple SPS PDSCHs. Specifically, the method for determining some SPS PDSCHs capable of being transmitted, in the multiple SPS PDSCHs, is the same as the foregoing method, which is not repeated here.

Manner b): generating feedback information for some SPS PDSCHs which are determined as capable of being transmitted, in the multiple SPS PDSCHs, and for which feedback is determined, based on indication of K1, to be performed in the current codebook. Specifically, the method for determining some SPS PDSCHs capable of being transmitted, in the multiple SPS PDSCHs, is the same as the foregoing method, which is not repeated here.

The present disclosure has been described above from the terminal side. Hereinafter, the present disclosure is further described from the network side.

Referring to FIG. 5, an information sending method according to an embodiment of the present disclosure is performed by a base station and includes the following steps.

Step 51: in case that a user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot.

Here, the some SPS PDSCHs may at least include: the SPS PDSCH with the smallest SPS configuration index among the multiple SPS PDSCHs. A time domain position of an SPS PDSCH is determined according to a start and length indication value (SLIV) of the SPS PDSCH.

Step 52: for the multiple SPS PDSCHs in the first slot, sending only the some SPS PDSCHs to the user equipment.

Through the above steps, in the embodiments of the present disclosure, each of the base station and the user equipment can determine some SPS PDSCHs whose time domain positions do not overlap, from the multiple SPS PDSCHs in the first slot, and then sends or receives the some SPS PDSCHs, thereby ensuring transmission performance when the multiple SPS PDSCHs overlap.

Similarly, at the base station side, the base station may determine some SPS PDSCHs whose time domain positions do not overlap, from the multiple SPS PDSCHs in the first slot, according to the following two determination methods.

The first determination manner

A1) taking the multiple SPS PDSCHs as a first set, or taking SPS PDSCHs that do not conflict with semi-statically configured uplink symbols, among the multiple SPS PDSCHs, as a first set; and initializing an empty second set;

A2) repeating the following steps until the first set does not include SPS PDSCHs whose time domain positions overlap: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set;

A3) adding remaining SPS PDSCHs in the first set to the second set, and taking SPS PDSCHs in the second set as the some SPS PDSCHs.

The second determination manner

B1) taking the multiple SPS PDSCHs as a first set, or taking SPS PDSCHs that do not conflict with semi-statically configured uplink symbols, among the multiple SPS PDSCHs, as a first set; and initializing an empty third set;

B2) repeating the following steps until the first set does not include SPS PDSCHs whose time domain positions overlap: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set;

B3) grouping each of remaining SPS PDSCHs in the updated first set into a group, and sorting each group in an ascending order of a smallest SPS configuration index in each group;

B4) according to an order of each group, sequentially adding a candidate SPS PDSCH with a smallest SPS configuration index in each group to the third set, where the candidate SPS PDSCH in each group is an SPS PDSCH in each group, which does not have overlapping time domain positions with current SPS PDSCHs in the third set;

B5) taking SPS PDSCHs in the third set as the some SPS PDSCHs.

Figure 6:
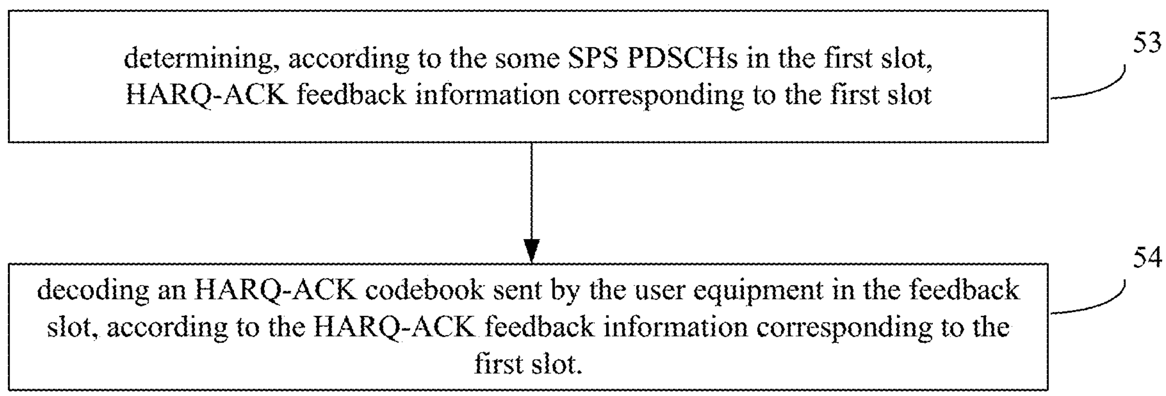
FIG. 6 is another flowchart of an information sending method according to an embodiment of the present disclosure.

According to at least one embodiment of the present disclosure, after sending the some SPS PDSCHs, the base station may further receive HARQ-ACK feedback information sent by the user equipment for the some SPS PDSCHs. Specifically, as shown in FIG. 6, after the foregoing step 52, the method further includes the following steps.

Step 53: when the base station determines that the user equipment performs, in a feedback slot, HARQ-ACK feedback for multiple SPS PDSCHs in the first slot, determining, according to the some SPS PDSCHs in the first slot, HARQ-ACK feedback information corresponding to the first slot.

Here, determining the HARQ-ACK feedback information corresponding to the first time slot refers to determining feedback information for which SPS PDSCHs is fed back by the user equipment in the HARQ-ACK feedback information corresponding to the first slot.

In addition, the base station may determine whether the user equipment performs, in the feedback slot, HARQ-ACK feedback for the multiple SPSPDSCHs in the first slot, in the following manner:

C1) determining candidate slots corresponding to the feedback slot, according to a feedback slot interval set (K1 set) between PDSCH and HARQ-ACK configured for the UE;

C2) selecting, from the candidate slots, target slots for which HARQ-ACK feedback needs to be performed in the feedback slot, according to whether there is at least one SPS PDSCH for which feedback needs to be performed in the feedback slot, in the candidate slots; for example, polling each candidate slot, and when there is at least one SPS PDSCH for which feedback needs to be performed in the feedback slot in a currently polled candidate slot, selecting this candidate slot as a target slot, until all candidate slots have been polled;

C3) according to whether the first slot belongs to the target slots, determining whether the user equipment performs, in the feedback slot, HARQ-ACK feedback for the multiple SPS PDSCHs in the first slot. For example, if the first slot belongs to the target slots, it is determined to perform, in the feedback slot, HARQ-ACK feedback for the multiple SPS PDSCHs in the first slot; otherwise, if the first slot does not belong to the target slots, it is determined to not perform, in the feedback slot, HARQ-ACK feedback for the multiple SPS PDSCHs in the first slot.

Step 54: receiving an HARQ-ACK codebook sent by the user equipment in the feedback slot, according to the HARQ-ACK feedback information corresponding to the first slot.

Through the above steps, in the embodiments of the present disclosure, each of the base station and the user equipment can determine some SPS PDSCHs whose time domain positions do not overlap, from the multiple SPS PDSCHs in the first slot, and then sends or receives HARQ-ACK feedback information according to the some SPS PDSCHs, thereby ensuring feedback performance when the multiple SPS PDSCHs overlap.

According to some embodiments of the present disclosure, when determining HARQ-ACK feedback information corresponding to the first slot according to the some SPS PDSCHs in the first slot, the above step 53 may specifically include: determining feedback information for each SPS PDSCH in the some SPS PDSCHs as the HARQ-ACK feedback information corresponding to the first slot.

According to other embodiments of the present disclosure, when determining HARQ-ACK feedback information corresponding to the first slot according to the some SPS PDSCHs in the first slot, the above step 53 may specifically include: determining target SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, determining feedback information for each SPS PDSCH in the target SPS PDSCHs as the HARQ-ACK feedback information corresponding to the first slot.

In addition, the manner of determining the some SPS PDSCHs in the first slot may refer to the above description, which is not repeated here. Of course, the some SPS PDSCHs determined above may also be directly used.

Implementation of the information receiving or sending methods in the embodiments of the present disclosure on both the user equipment and the network have been described above. In order to help understanding of the present disclosure, several examples of applying the information receiving or sending methods of the embodiments of the present disclosure are further provided hereinafter with reference to the accompanying drawings.

Example 1

Figure 7:
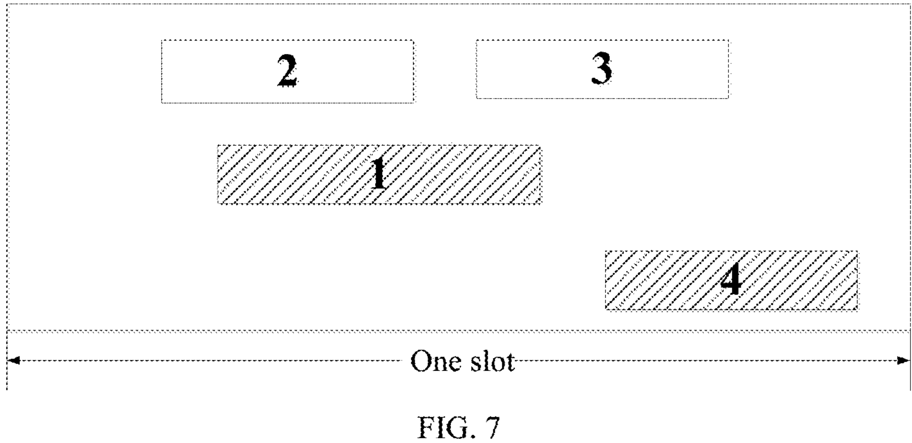
FIG. 7 is a schematic diagram showing an example of transmission of SPS PDSCHs according to an embodiment of the present disclosure.
Figure 8:
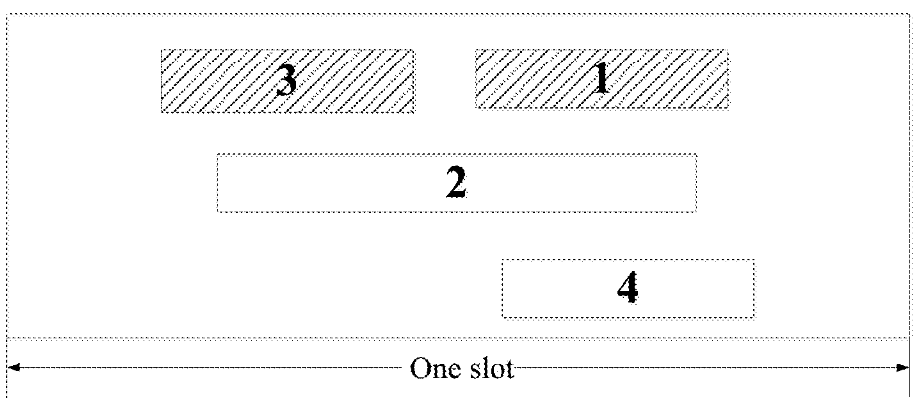
FIG. 8 is a schematic diagram showing another example of transmission of SPS PDSCHs according to an embodiment of the present disclosure.

FIG. 7 and FIG. 8 shows examples of transmission of four active SPS PDSCHs in one slot. The four SPS PDSCHs include SPS PDSCHs with SPS configuration indexes 1-4. The four SPS PDSCHs overlap in the time domain. For example, in FIG. 7, the SPS PDSCH with SPS configuration index 1 overlaps with each of the SPS PDSCH with SPS configuration index 2 and the SPS PDSCH with SPS configuration index 3 in the time domain; and the SPS PDSCH with SPS configuration index 3 overlaps with the SPS PDSCH with SPS configuration index 4 in the time domain. In FIG. 8, the SPS PDSCH with SPS configuration index 2 overlaps with each of the SPS PDSCH with SPS configuration index 1, the SPS PDSCH with SPS configuration index 3 and the SPS PDSCH with SPS configuration index 4 in the time domain; and the SPS PDSCH with SPS configuration index 4 overlaps with the SPS PDSCH with SPS configuration index 1 in the time domain.

With reference to FIG. 7 and FIG. 8, the process of determining some SPS PDSCHs capable of being transmitted among multiple SPS PDSCHs, is as follows.

First Manner

For an overlapping situation in FIG. 7, taking SLIVs corresponding to the four SPS PDSCH configurations as a set Q; determining that SLIVs which overlap with the SLIV corresponding to the SPS configuration index 1 are SLIVs corresponding to the SPS configuration index 2 and SPS configuration index 3, and putting the SLIV corresponding to the SPS configuration index 1 into a set Y; removing the SLIVs corresponding to the SPS configuration index 1, the SPS configuration index 2 and SPS configuration index 3, from the set Q, with only the SLIV corresponding to the SPS configuration index 4 remained in the set Q, so that there are no overlapping SPS configurations in the set Q; then, putting the SLIV corresponding to the SPS configuration index 4 from the set Q into the set Y, so that the obtained set Y includes the SLIVs corresponding to the SPS configuration index 1 and the SPS configuration index 4. Therefore, it is determined that SPS PDSCHs corresponding to the SPS configuration index 1 and the SPS configuration index 4 are capable of being transmitted in the one slot.

For an overlapping situation in FIG. 8, taking SLIVs corresponding to the four SPS PDSCH configurations as a set Q; determining that SLIVs which overlap with the SLIV corresponding to the SPS configuration index 1 are SLIVs corresponding to the SPS configuration index 2 and SPS configuration index 4, and putting the SLIV corresponding to the SPS configuration index 1 into a set Y; removing the SLIVs corresponding to the SPS configuration index 1, the SPS configuration index 2 and SPS configuration index 4, from the set Q, with only the SLIV corresponding to the SPS configuration index 3 remained in the set Q, so that there are no overlapping SPS configurations in the set Q; then, putting the SLIV corresponding to the SPS configuration index 3 into the set Y, so that the obtained set Y includes the SLIVs corresponding to the SPS configuration index 1 and the SPS configuration index 3. Therefore, it is determined that SPS PDSCHs corresponding to the SPS configuration index 1 and the SPS configuration index 3 are capable of being transmitted in the one slot.

Second Manner

For an overlapping situation in FIG. 7, SLIVs corresponding to the four SPS PDSCH configurations are taken as a set Q, and SLIVs in the set Q are divided into multiple groups. Specifically, an SLIV with an earliest end symbol position is an SLIV corresponding to the SPS configuration index 2, and is taken as a resource A; SLIVs with start symbol positions earlier than the end symbol position of the resource A include the SLIV corresponding to the SPS configuration index 2 and an SLIV corresponding to the SPS configuration index 1, and thus the SLIVs corresponding to the SPS configuration index 2 and the SPS configuration index 1 are grouped into one group. After removing the SLIVs corresponding to the SPS configuration index 2 and the SPS configuration index 1 from the set Q, remaining SLIVs in the set Q include SLIVs corresponding to the SPS configuration index 3 and the SPS configuration index 4. From the remaining SLIVs in the set Q, an SLIV with an earliest end symbol position is the SLIV corresponding to the SPS configuration index 3, and is taken as a resource A; SLIVs with start symbol positions earlier than the end symbol position of the resource A include the SLIV corresponding to the SPS configuration index 3 and the SLIV corresponding to the SPS configuration index 4, and thus the SLIVs corresponding to the SPS configuration index 3 and the SPS configuration index 4 are grouped into one group. In this way, two groups of SLIVs are obtained. One group includes SLIVs corresponding to the SPS configuration index 1 and the SPS configuration index 2; and other group includes SLIVs corresponding to the SPS configuration index 3 and the SPS configuration index 4. Then, these groups are sorted based on an order of the SPS configuration index of the SLIV with the smallest SPS configuration index in each group, so that the first group includes SLIVs corresponding to the SPS configuration index 1 and the SPS configuration index 2, and the second group includes SLIVs corresponding to the SPS configuration index 3 and the SPS configuration index 4. After that, it is determined that, in the first group, SPS PDSCH corresponding to the SPS configuration index 1 is capable of being transmitted. In the second group, the SLIV corresponding to the SPS configuration index 3 overlaps with the SLIV corresponding to the SPS configuration index 1, and the SLIV corresponding to the SPS configuration index 4 does not overlap with the SLIV corresponding to the SPS configuration index 1, and then it is determined that in the second group, SPS PDSCH corresponding to the SPS configuration index 4 is capable of being transmitted. Finally, SPS PDSCHs corresponding to the SPS configuration index 1 and the SPS configuration index 4 are capable of being transmitted in the current slot.

For an overlapping situation in FIG. 8, SLIVs corresponding to the four SPS PDSCH configurations are taken as a set Q, and SLIVs in the set Q are divided into multiple groups. Specifically, an SLIV with an earliest end symbol position is an SLIV corresponding to the SPS configuration index 3, and is taken as a resource A; SLIVs with start symbol positions earlier than the end symbol position of the resource A include the SLIV corresponding to the SPS configuration index 3 and an SLIV corresponding to the SPS configuration index 2, and thus the SLIVs corresponding to the SPS configuration index 3 and the SPS configuration index 2 are grouped into one group. After removing the SLIVs corresponding to the SPS configuration index 3 and the SPS configuration index 2 from the set Q, remaining SLIVs in the set Q include SLIVs corresponding to the SPS configuration index 1 and the SPS configuration index 4. From the remaining SLIVs in the set Q, an SLIV with an earliest end symbol position is the SLIV corresponding to the SPS configuration index 1, and is taken as a resource A; SLIVs with start symbol positions earlier than the end symbol position of the resource A include the SLIV corresponding to the SPS configuration index 1 and the SLIV corresponding to the SPS configuration index 4, and thus the SLIVs corresponding to the SPS configuration index 1 and the SPS configuration index 4 are grouped into one group. In this way, two groups of SLIVs are obtained. One group includes SLIVs corresponding to the SPS configuration index 3 and the SPS configuration index 2; and other group includes SLIVs corresponding to the SPS configuration index 1 and the SPS configuration index 4. Then, these groups are sorted based on an order of the SPS configuration index of the SLIV with the smallest SPS configuration index in each group, so that the first group includes SLIVs corresponding to the SPS configuration index 1 and the SPS configuration index 4, and the second group includes SLIVs corresponding to the SPS configuration index 2 and the SPS configuration index 3. After that, it is determined that, in the first group, SPS PDSCH corresponding to the SPS configuration index 1 is capable of being transmitted. In the second group, the SLIV corresponding to the SPS configuration index 2 overlaps with the SLIV corresponding to the SPS configuration index 1, and the SLIV corresponding to the SPS configuration index 3 does not overlap with the SLIV corresponding to the SPS configuration index 1, and then it is determined that in the second group, SPS PDSCH corresponding to the SPS configuration index 3 is capable of being transmitted. Finally, SPS PDSCHs corresponding to the SPS configuration index 1 and the SPS configuration index 3 are capable of being transmitted in the current slot.

Example 2

Figure 9:
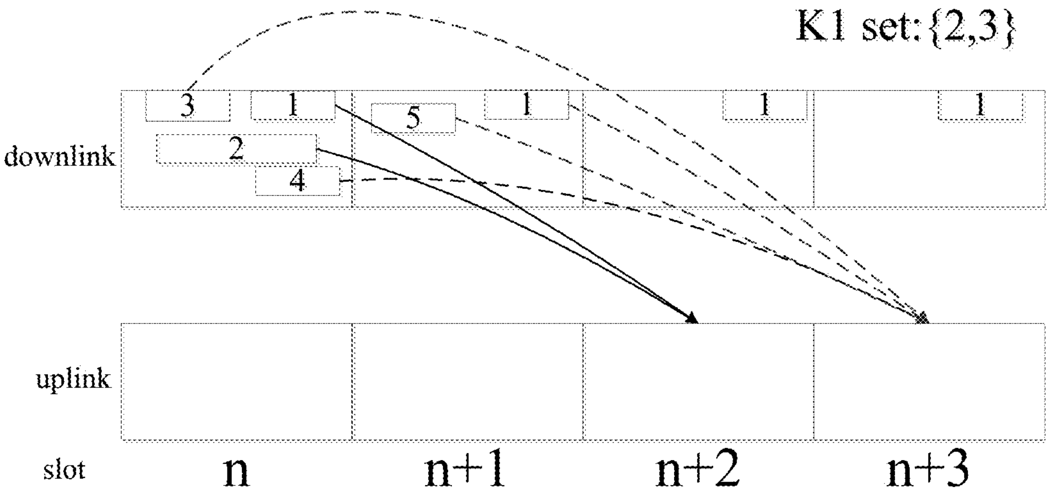
FIG. 9 is a schematic diagram showing an example of HARQ-ACK feedback according to an embodiment of the present disclosure.

As shown in FIG. 9, in a slot n, there are four overlapping SPS PDSCH transmissions, which are corresponding to different SPS configurations. A value of K1 corresponding to an SPS configuration index 1 and an SPS configuration index 2 is 2; and a value of K1 corresponding to an SPS configuration index 3 and an SPS configuration index 4 is 3. Assuming that a currently configured K1 set includes 2 and 3, a process of generating HARQ-ACK feedback in a slot (n+2) or in a slot (n+3) is as follows.

1) For HARQ-ACK Feedback Transmitted in the Slot (n+2)

Assuming that there is only feedback information for SPS PDSCH transmission, when determining an HARQ-ACK codebook, it is needed to first determine whether there is an SPS PDSCH for which feedback needs to be performed in the current slot based on indication of K1, in PDSCH transmission slots corresponding to the configured K1 set. Since the K1 set includes 2 and 3, PDSCH transmission slots corresponding to the slot (n+2) include a slot (n−1) and a slot n. In the slot (n−1), there is no SPS PDSCH for which feedback needs to be performed in the slot (n+2). In the slot n, there are multiple SPS PDSCHs, and feedback needs to be performed in the slot (n+2) for SPS PDSCHs corresponding to the SPS configuration index 1 and SPS configuration index 2. Therefore, it is necessary to consider how to generate feedback information for the slot n in an HARQ-ACK feedback codebook transmitted in the slot (n+2).

A) One way is to generate HARQ-ACK feedback information for some SPS PDSCHs which are determined as capable of being transmitted, in multiple SPS PDSCHs. Based on analysis of the case of overlapping shown in FIG. 8 in the example 1, it can be known that SPS PDSCHs corresponding to the SPS configuration index 1 and the SPS configuration index 3 are capable of being transmitted. Therefore, the HARQ-ACK feedback codebook transmitted in the slot (n+2) includes feedback information for both the SPS PDSCHs corresponding to the SPS configuration index 1 and the SPS configuration index 3 in the slot n, that is, 2-bit feedback information is generated.

B) Another way is to generate feedback information for some SPS PDSCHs which are determined as capable of being transmitted, in the multiple SPS PDSCHs, and for which feedback is determined, based on indication of K1, to be performed in the current codebook. Based on analysis of the case of overlapping shown in FIG. 8 in the example 1, it can be known that SPS PDSCHs corresponding to the SPS configuration index 1 and the SPS configuration index 3 are capable of being transmitted. But K1 of the SPS configuration index 3 indicates feedback in a slot (n+3), and K1 of the SPS configuration index 1 indicates feedback in a slot (n+2). Therefore, the HARQ-ACK feedback codebook transmitted in the slot (n+2) includes only feedback information for the SPS PDSCH corresponding to the SPS configuration index 1 in the slot n, that is, 1-bit feedback information is generated.

2) For HARQ-ACK Feedback Transmitted in the Slot (n+3)

Assuming that there is only feedback information for SPS PDSCH transmission, when determining an HARQ-ACK codebook, it is needed to first determine whether there is an SPS PDSCH for which feedback needs to be performed in the current slot based on indication of K1, in PDSCH transmission slots corresponding to the configured K1 set. Since the K1 set includes 2 and 3, PDSCH transmission slots corresponding to the slot (n+3) include a slot n and a slot (n+1). In the slot n, there are multiple SPS PDSCHs, and feedback needs to be performed in the slot (n+3) for SPS PDSCHs corresponding to the SPS configuration index 3 and SPS configuration index 4. Feedback needs to be performed in the slot (n+3) for SPS PDSCHs corresponding to the SPS configuration index 2 and SPS configuration index 5 in the slot (n+1). Therefore, it is necessary to consider how to generate feedback information for the slot n and the slot (n+1) in an HARQ-ACK feedback codebook transmitted in the slot (n+3).

A) One way is to generate HARQ-ACK feedback information for some SPS PDSCHs which are determined as capable of being transmitted, in multiple SPS PDSCHs. Based on analysis of the case of overlapping shown in FIG. 8 in the example 1, it can be known that SPS PDSCHs corresponding to the SPS configuration index 1 and the SPS configuration index 3 are capable of being transmitted in the slot n. Therefore, the HARQ-ACK feedback codebook transmitted in the slot (n+3) includes feedback information for both the SPS PDSCHs corresponding to the SPS configuration index 1 and the SPS configuration index 3 in the slot n, that is, 2-bit feedback information is generated. SPS PDSCHs corresponding to the SPS configuration index 5 and the SPS configuration index 1 are capable of being transmitted in the slot (n+1). Therefore, the HARQ-ACK feedback codebook transmitted in the slot (n+3) includes feedback information for both the SPS PDSCHs corresponding to the SPS configuration index 5 and the SPS configuration index 1 in the slot (n+1), that is, 2-bit feedback information is generated. Therefore, a total of 4 bits of feedback information are included in the HARQ-ACK feedback codebook transmitted in the slot (n+3).

B) Another way is to generate feedback information for some SPS PDSCHs which are determined as capable of being transmitted, in the multiple SPS PDSCHs, and for which feedback is determined, based on indication of K1, to be performed in the current codebook. Based on analysis of the case of overlapping shown in FIG. 8 in the example 1, it can be known that SPS PDSCHs corresponding to the SPS configuration index 1 and the SPS configuration index 3 are capable of being transmitted in the slot n. But K1 of the SPS configuration index 3 indicates feedback in a slot (n+3), and K1 of the SPS configuration index 1 indicates feedback in a slot (n+2). Therefore, the HARQ-ACK feedback codebook transmitted in the slot (n+3) includes only feedback information for the SPS PDSCH corresponding to the SPS configuration index 3 in the slot n, that is, 1-bit feedback information is generated. SPS PDSCHs corresponding to the SPS configuration index 5 and the SPS configuration index 2 are capable of being transmitted in the slot (n+1), and feedback for the SPS PDSCHs corresponding to the SPS configuration index 5 and the SPS configuration index 2 are performed in the slot (n+3). Therefore, the HARQ-ACK feedback codebook transmitted in the slot (n+3) includes feedback information for both the SPS PDSCHs corresponding to the SPS configuration index 5 and the SPS configuration index 2 in the slot (n+1), that is, 2-bit feedback information is generated. Therefore, a total of 3 bits of feedback information are included in the HARQ-ACK feedback codebook transmitted in the slot (n+3).

Various methods of embodiments of the present disclosure have been described above. Devices for implementing the above methods will be further provided hereinafter.

Figure 10:
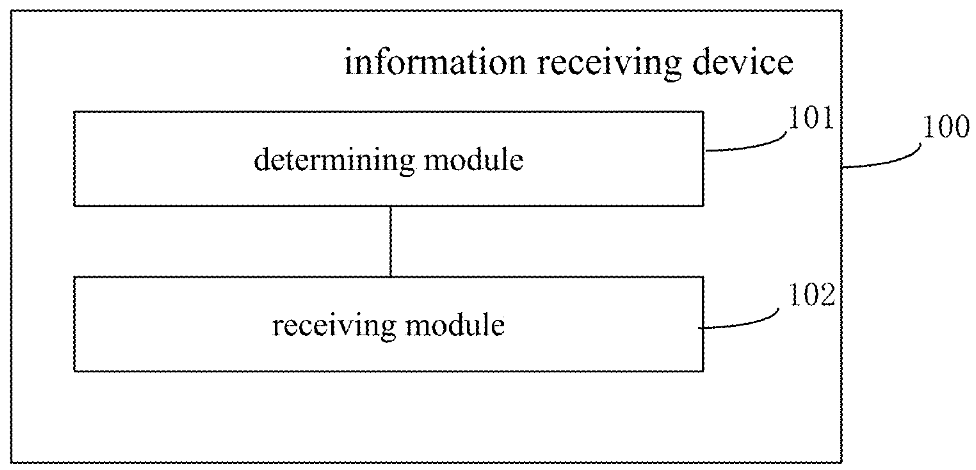
FIG. 10 is a schematic diagram of an information receiving device according to an embodiment of the present disclosure.

Referring to FIG. 10, an information receiving device 100 is provided according to an embodiment of the present disclosure, and can be applied to a user equipment. As shown in FIG. 10, the information receiving device 100 includes:

a determining module 101 configured to, in case that the user equipment is configured with multiple SPS PDSCHs and there are overlaps among multiple SPS PDSCHs on time domain positions in a first slot, determine, according to SPS configuration indexes of the SPS PDSCHs and the time domain positions of the SPS PDSCHs, some SPS PDSCHs whose time domain positions do not overlap, from the multiple SPS PDSCHs in the first slot;

a receiving module 102 configured to, for the multiple SPS PDSCHs in the first slot, decode only the some SPS PDSCHs of the multiple SPS PDSCHs.

Optionally, the foregoing information receiving device further includes the following modules (not shown in the figures):

a generating module configured to, in case that the UE is configured to use a dynamic HARQ-ACK codebook, or the HARQ-ACK codebook of the UE includes only an HARQ-ACK codebook including feedback information of the SPS PDSCH, when it is determined to perform, in a feedback slot, HARQ-ACK feedback for multiple SPS PDSCHs in the first slot, generate, according to the some SPS PDSCHs in the first slot, HARQ-ACK feedback information corresponding to the first slot;

a sending module configured to send an HARQ-ACK codebook in the feedback slot, where the HARQ-ACK codebook includes the HARQ-ACK feedback information corresponding to the first slot.

Optionally, the generating module is further configured to, generate HARQ-ACK feedback information for each SPS PDSCH in the some SPS PDSCHs; or, determine SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, generate HARQ-ACK feedback information for each determined SPS PDSCH.

Optionally, the foregoing information receiving device further includes the following modules (not shown in the figures):

a feedback determining module configured to determine whether to perform, in the feedback slot, HARQ-ACK feedback for the multiple SPS PDSCHs in the first slot in the following manner:

determining candidate slots corresponding to the feedback slot, according to a feedback slot interval set (K1 set) between PDSCH and HARQ-ACK configured for the UE;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether to perform, in the feedback slot, HARQ-ACK feedback for the multiple SPS PDSCHs in the first slot.

Optionally, the some SPS PDSCHs may at least include: the SPS PDSCH with the smallest SPS configuration index among the multiple SPS PDSCHs.

Optionally, the determining module 101 is further configured to, take the multiple SPS PDSCHs as a first set, or take SPS PDSCHs that do not conflict with semi-statically configured uplink symbols, among the multiple SPS PDSCHs, as a first set; and initialize an empty second set;

repeat the following steps until the first set does not include SPS PDSCHs whose time domain positions overlap: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set;

add remaining SPS PDSCHs in the updated first set to the second set, and take SPS PDSCHs in the second set as the some SPS PDSCHs.

Optionally, the determining module 101 is further configured to, take the multiple SPS PDSCHs as a first set, or take SPS PDSCHs that do not conflict with semi-statically configured uplink symbols, among the multiple SPS PDSCHs, as a first set; and initialize an empty third set;

repeat the following steps until the first set does not include SPS PDSCHs whose time domain positions overlap: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set;

group SPS PDSCHs in each updated first set into a group, and sort each group in an ascending order of a smallest SPS configuration index in each group;

according to an order of each group, sequentially add a candidate SPS PDSCH with a smallest SPS configuration index in each group to the third set, where the candidate SPS PDSCH in each group is an SPS PDSCH in each group, which does not have overlapping time domain positions with current SPS PDSCHs in the third set;

take SPS PDSCHs in the third set as the some SPS PDSCHs.

Optionally, a time domain position of an SPS PDSCH is determined according to a start and length indication value (SLIV) of the SPS PDSCH.

Figure 11:
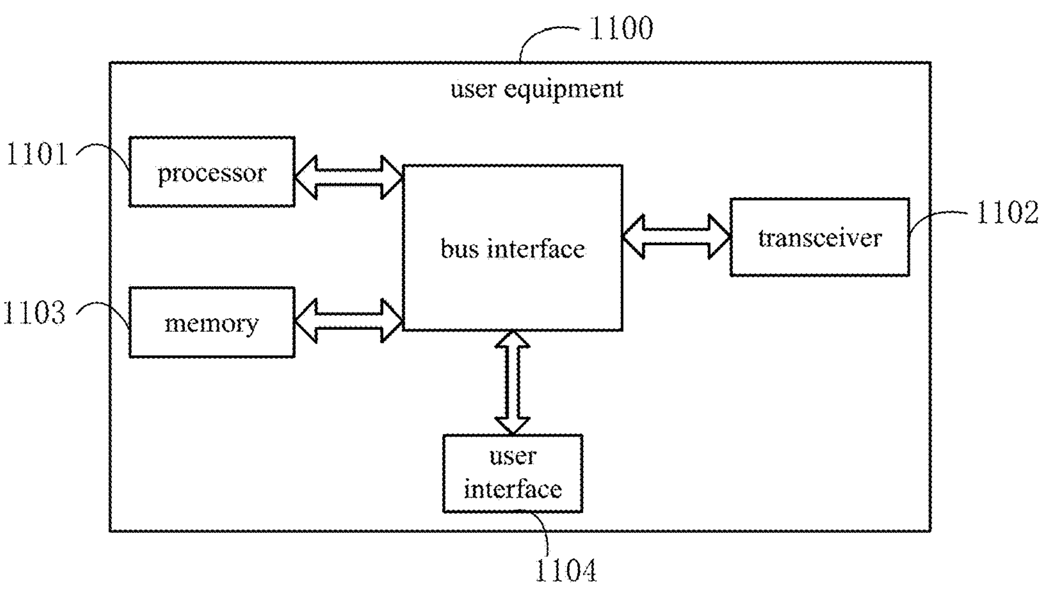
FIG. 11 is a schematic diagram of a user equipment according to an embodiment of the present disclosure.

Referring to FIG. 11, which is a schematic diagram of a user equipment according to an embodiment of the present disclosure. The user equipment 1100 includes a processor 1101, a transceiver 1102, a memory 1103, a user interface 1104, and a bus interface.

In the embodiment of the present disclosure, the user equipment 1100 further includes: a program that is stored in the memory 1103 and executed the processor 1101.

The processor 1101 executes the program to implements the following steps:

in case that the user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot;

for the multiple SPS PDSCHs in the first slot, decoding, by the UE, only the some SPS PDSCHs of the multiple SPS PDSCHs.

It is understandable that, in the embodiment of the present disclosure, when the program is executed by the processor 1101, each process of the information receiving method of embodiments shown in FIG. 3 or FIG. 4 can be realized, and the same technical effect can be achieved, which are not repeated here to avoid repetition.

In FIG. 11, the bus architecture may include any number of interconnected bus and bridge. Specifically, various circuits of one or more processors, which are represented by the processor 1101, and one or more memories, which are represented by the memory 1103, are linked together. The bus architecture may link various other circuits, such as a peripheral device, voltage regulator and a power management circuit together. These features are well known in this field, therefore, this disclosure does not make further description on these features. The bus interface provides an interface. The transceiver 1102 may be multiple elements, including a transmitter and a receiver and provide units, which communicate with other devices on the transmission medium. For different user equipment, the user interface 1104 may also be an interface capable of externally/internally connecting with the required devices, the connected devices including but not limited to a keypad, a display, a speaker, a microphone, and a joystick.

The processor 1101 is responsible for managing bus architecture and general processing. The memory 1103 may store data used by the processor 1101 when executing operations.

It should be noted that embodiments of the user equipment are in one-to-one correspondence with the above method embodiments applied to the user equipment, and all implementations in the above method embodiments are applicable to the embodiments of the user equipment, and the same or similar technical effects can also be achieved.

In some embodiments of the present disclosure, a computer-readable storage medium is further provided and includes a program stored thereon. The program is executed by a processor to implement the following steps:

in case that the user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot;

for the multiple SPS PDSCHs in the first slot, decoding, by the UE, only the some SPS PDSCHs of the multiple SPS PDSCHs.

When the program is executed by the processor, all the implementation modes in the information receiving method applied to the user equipment can be realized, and the same technical effect can be achieved, which are not repeated here to avoid repetition.

Figure 12:
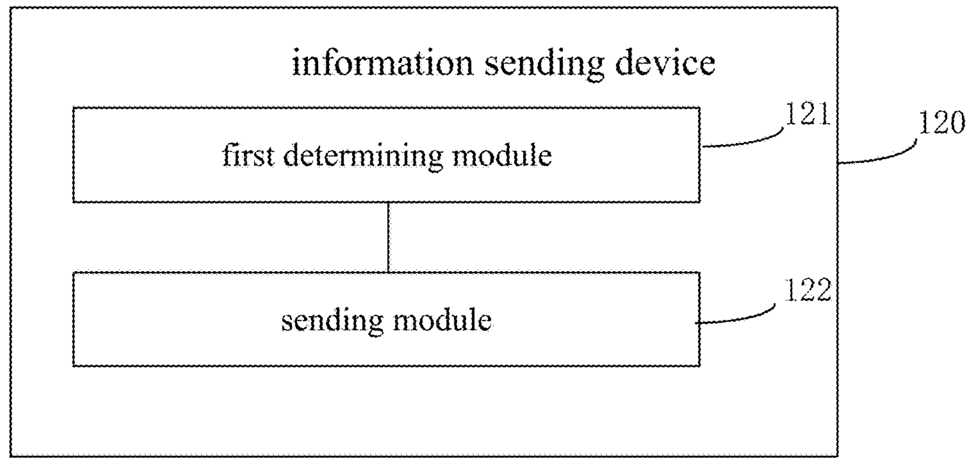
FIG. 12 is a schematic diagram of an information sending device according to an embodiment of the present disclosure.

Referring to FIG. 12, an information sending device is provided according to an embodiment of the present disclosure, and can be applied to a base station. As shown in FIG. 12, the information sending device 120 includes:

a first determining module 121 configured to, in case that a user equipment is configured with multiple SPS PDSCHs and there are overlaps among multiple SPS PDSCHs on time domain positions in a first slot, determine, according to SPS configuration indexes of the SPS PDSCHs and the time domain positions of the SPS PDSCHs, some SPS PDSCHs whose time domain positions do not overlap, from the multiple SPS PDSCHs in the first slot;

a sending module 122 configured to, for the multiple SPS PDSCHs in the first slot, send only the some SPS PDSCHs to the user equipment.

Optionally, the foregoing information sending device further includes the following modules (not shown in the figures):

a second determining module configured to, in case that the UE is configured to use a dynamic HARQ-ACK codebook, or the HARQ-ACK codebook of the UE includes only an HARQ-ACK codebook including feedback information of the SPS PDSCH, when the base station determines that the user equipment performs, in a feedback slot, HARQ-ACK feedback for multiple SPS PDSCHs in the first slot, determine, according to the some SPS PDSCHs in the first slot, HARQ-ACK feedback information corresponding to the first slot;

a receiving module configured to receive an HARQ-ACK codebook sent by the user equipment in the feedback slot, according to the HARQ-ACK feedback information corresponding to the first slot.

Optionally, the second determining module is further configured to, determine feedback information for each SPS PDSCH in the some SPS PDSCHs as the HARQ-ACK feedback information corresponding to the first slot;

or, determine target SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, determine feedback information for each SPS PDSCH in the target SPS PDSCHs as the HARQ-ACK feedback information corresponding to the first slot.

Optionally, the foregoing information sending device further includes the following modules (not shown in the figures):

a feedback determining module configured to determine whether the user equipment performs, in the feedback slot, HARQ-ACK feedback for the multiple SPSPDSCHs in the first slot, in the following manner:

determining candidate slots corresponding to the feedback slot, according to a feedback slot interval set (K1 set) between PDSCH and HARQ-ACK configured for the UE;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether the user equipment performs, in the feedback slot, HARQ-ACK feedback for the multiple SPS PDSCHs in the first slot.

Optionally, the some SPS PDSCHs may at least include: the SPS PDSCH with the smallest SPS configuration index among the multiple SPS PDSCHs.

Optionally, the first determining module 121 is further configured to, take the multiple SPS PDSCHs as a first set, or take SPS PDSCHs that do not conflict with semi-statically configured uplink symbols, among the multiple SPS PDSCHs, as a first set; and initialize an empty second set;

repeat the following steps until the first set does not include SPS PDSCHs whose time domain positions overlap: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set;

add remaining SPS PDSCHs in the updated first set to the second set, and take SPS PDSCHs in the second set as the some SPS PDSCHs.

Optionally, the first determining module 121 is further configured to, take the multiple SPS PDSCHs as a first set, or take SPS PDSCHs that do not conflict with semi-statically configured uplink symbols, among the multiple SPS PDSCHs, as a first set; and initialize an empty third set;

repeat the following steps until the first set does not include SPS PDSCHs whose time domain positions overlap: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set;

group SPS PDSCHs in each updated first set into a group, and sort each group in an ascending order of a smallest SPS configuration index in each group;

according to an order of each group, sequentially add a candidate SPS PDSCH with a smallest SPS configuration index in each group to the third set, where the candidate SPS PDSCH in each group is an SPS PDSCH in each group, which does not have overlapping time domain positions with current SPS PDSCHs in the third set;

take SPS PDSCHs in the third set as the some SPS PDSCHs.

Optionally, a time domain position of an SPS PDSCH is determined according to a start and length indication value (SLIV) of the SPS PDSCH.

Figure 13:
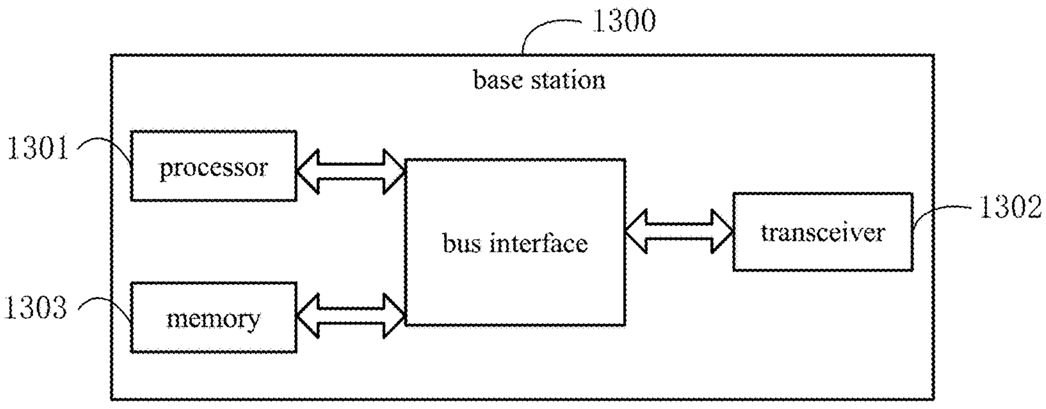
FIG. 13 is a schematic diagram of a base station according to an embodiment of the present disclosure.

Referring to FIG. 13, which is a schematic diagram of a base station 1300 according to an embodiment of the present disclosure. The base station 1300 includes a processor 1301, a transceiver 1302, a memory 1303, and a user interface.

In the embodiment of the present disclosure, the base station 1300 further includes: a program that is stored in the memory 1303 and executed the processor 1301. The processor 1301 executes the program to implements the following steps:

in case that a user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot;

for the multiple SPS PDSCHs in the first slot, sending only the some SPS PDSCHs to the user equipment.

It is understandable that, in the embodiment of the present disclosure, when the program is executed by the processor 1301, each process of the information sending method of embodiments shown in FIG. 5 or FIG. 6 can be realized, and the same technical effect can be achieved, which are not repeated here to avoid repetition.

In FIG. 13, a bus architecture may include any number of interconnected bus and bridge. Specifically, various circuits of one or more processors, which are represented by the processor 1301, and one or more memories, which are represented by the memory 1303, are linked together. The bus architecture may link various other circuits, such as a peripheral device, voltage regulator and a power management circuit together. These features are well known in this field, therefore, this disclosure does not make further description on these features. The bus interface provides an interface. The transceiver 1302 may be multiple elements, including a transmitter and a receiver and provide units, which communicate with other devices on the transmission medium.

The processor 1301 is responsible for managing bus architecture and general processing. The memory 1303 may store data used by the processor 1301 when executing operations.

It should be noted that embodiments of the base station are in one-to-one correspondence with the above method embodiments applied to the base station, and all implementations in the above method embodiments are applicable to the embodiments of the base station, and the same or similar technical effects can also be achieved.

In some embodiments of the present disclosure, a computer-readable storage medium is further provided and includes a program stored thereon. The program is executed by a processor to implement the following steps:

in case that a user equipment is configured with multiple SPS PDSCHs and there are overlaps among multiple SPS PDSCHs on time domain positions in a first slot, determining, according to SPS configuration indexes of the SPS PDSCHs and the time domain positions of the SPS PDSCHs, some SPS PDSCHs whose time domain positions do not overlap, from the multiple SPS PDSCHs in the first slot;

for the multiple SPS PDSCHs in the first slot, sending only the some SPS PDSCHs to the user equipment.

When the program is executed by the processor, all the implementation modes in the information sending method applied to the base station can be realized, and the same technical effect can be achieved, which are not repeated here to avoid repetition.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above may refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only the specific embodiments of the present disclosure, and the protection scope of the present disclosure is not limited thereto. Any technical personnel who is familiar with the technical field can easily think of changes or substitutions within the technical scope of the present disclosure and these changes and substitutions should be included in the protection scope of the present disclosure. Therefore, the protection scope of the present disclosure should be subject to the protection scope of the claims.

What is claimed is:

1. An information receiving method, performed by a user equipment (UE), comprising:

in case that multiple SPS PDSCHs are configured in a first slot, determining, according to an SPS configuration index of each of the multiple SPS PDSCHs and a time domain position of each of the multiple SPS PDSCHs, some SPS PDSCHs whose time domain positions do not overlap in the first slot; and decoding, by the user equipment, the some SPS PDSCHs;

wherein the determining, according to an SPS configuration index of each of the multiple SPS PDSCHs and a time domain position of each of the multiple SPS PDSCHs, some SPS PDSCHs whose time domain positions do not overlap in the first slot, includes:

taking the multiple SPS PDSCHs as a first set, or taking SPS PDSCHs that do not conflict with semi-statically configured uplink symbols, among the multiple SPS PDSCHs, as a first set;

and initializing an empty second set; performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap; adding remaining SPS PDSCHs in the first set to the second set, and taking SPS PDSCHs in the second set as the some SPS PDSCHs;

or, taking the multiple SPS PDSCHs as a first set, or taking SPS PDSCHs that do not conflict with semi-statically configured uplink symbols, among the multiple SPS PDSCHs, as a first set;

and initializing an empty third set; performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap; grouping each of remaining SPS PDSCHs in the updated first set into a group, and sorting each group in an ascending order of a smallest SPS configuration index in each group; according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set; taking SPS PDSCHs in the third set as the some SPS PDSCHs;

where in the some SPS PDSCHs at least include: an SPS PDSCH with a smallest SPS configuration index among the multiple SPS PDSCHs.

2. The method according to claim 1, wherein the method further includes:

in case that the user equipment is configured to use a dynamic HARQ-ACK codebook, or an HARQ-ACK codebook of the user equipment includes only feedback information of the SPS PDSCH correspond to an HARQ-ACK codebook, when it is determined to perform, in a feedback slot, HARQ-ACK feedback for the multiple SPS PDSCHs, generating HARQ-ACK feedback information according to the some SPS PDSCHs; and sending, in the feedback slot, an HARQ-ACK codebook including the HARQ-ACK feedback information corresponding to the some SPS PDSCHs.

3. The method according to claim 2, wherein the generating HARQ-ACK feedback information according to the some SPS PDSCHs, includes:

generating HARQ-ACK feedback information for each SPS PDSCH in the some SPS PDSCHs;

or, determining SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, generating HARQ-ACK feedback information for each determined SPS PDSCH.

4. The method according to claim 2, wherein determining, by the user equipment, whether to perform, in the feedback slot, HARQ-ACK feedback for the multiple SPS PDSCHs, includes:

determining candidate slots corresponding to the feedback slot, according to a feedback slot interval set between PDSCH and HARQ-ACK configured for the user equipment;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether to perform, in the feedback slot, HARQ-ACK feedback for the multiple SPS PDSCHs.

5. The method according to claim 1, wherein the time domain position of the SPS PDSCH is determined according to a start and length indication value (SLIV) of the SPS PDSCH.

6. An information sending method, performed by a base station, comprising:

in case that multiple SPS PDSCHs are configured for a user equipment in a first slot, determining, according to an SPS configuration index of each of the multiple SPS PDSCHs and a time domain position of each of the multiple SPS PDSCHs, some SPS PDSCHs whose time domain positions do not overlap in the first slot;

sending the some SPS PDSCHs to the user equipment;

wherein the determining, according to an SPS configuration index of each of the multiple SPS PDSCHs and a time domain position of each of the multiple SPS PDSCHs, some SPS PDSCHs whose time domain positions do not overlap in the first slot, includes:

taking the multiple SPS PDSCHs as a first set, or taking SPS PDSCHs that do not conflict with semi-statically configured uplink symbols, among the multiple SPS PDSCHs, as a first set;

and initializing an empty second set; performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap; adding remaining SPS PDSCHs in the first set to the second set, and taking SPS PDSCHs in the second set as the some SPS PDSCHs;

or, taking the multiple SPS PDSCHs as a first set, or taking SPS PDSCHs that do not conflict with semi-statically configured uplink symbols, among the multiple SPS PDSCHs, as a first set;

and initializing an empty third set; performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap; grouping each of remaining SPS PDSCHs in the updated first set into a group, and sorting each group in an ascending order of a smallest SPS configuration index in each group; according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set; taking SPS PDSCHs in the third set as the some SPS PDSCHs;

wherein the some SPS PDSCHs at least include: an SPS PDSCH with a smallest SPS configuration index among the multiple SPS PDSCHs.

7. The method according to claim 6, wherein the method further includes:

in case that the user equipment is configured to use a dynamic HARQ-ACK codebook, or an HARQ-ACK codebook of the user equipment includes only feedback information of the SPS PDSCH correspond to an HARQ-ACK codebook, when it is determined that the user equipment performs, in a feedback slot, HARQ-ACK feedback for multiple SPS PDSCHs, determining HARQ-ACK feedback information according to the some SPS PDSCHs;

receiving an HARQ-ACK codebook sent by the user equipment in the feedback slot, according to the HARQ-ACK feedback information corresponding to the some SPS PDSCHs.

8. The method according to claim 7, wherein the determining HARQ-ACK feedback information according to the some SPS PDSCHs, includes:

determining feedback information for each SPS PDSCH in the some SPS PDSCHs as the HARQ-ACK feedback information;

or, determining target SPS PDSCHs for which feedback needs to be performed in the feedback slot, from the some SPS PDSCHs, according to a feedback slot interval K1 between PDSCH included in the some SPS PDSCHs and HARQ-ACK, corresponding to the some SPS PDSCHs; and, determining feedback information for each SPS PDSCH in the target SPS PDSCHs as the HARQ-ACK feedback information.

9. The method according to claim 7, wherein determining, by the base station, whether the user equipment performs, in the feedback slot, HARQ-ACK feedback for multiple SPS PDSCHs, includes:

determining candidate slots corresponding to the feedback slot, according to a feedback slot interval set between PDSCH and HARQ-ACK configured for the user equipment;

selecting, from the candidate slots, target slots for which HARQ-ACK feedback needs to be performed in the feedback slot, according to whether there is at least one SPS PDSCH for which feedback needs to be performed in the feedback slot, in the candidate slots;

according to whether the first slot belongs to the target slots, determining whether the user equipment performs, in the feedback slot, HARQ-ACK feedback for the multiple SPS PDSCHs.

10. A user equipment, comprising: a memory, a processor, a transceiver, and a program stored on the memory and executable by the processor; wherein the processor executes the program to implement:

in case that multiple SPS PDSCHs are configured in a first slot, determining, according to an SPS configuration index of each of the multiple SPS PDSCHs and a time domain position of each of the multiple SPS PDSCHs, some SPS PDSCHs whose time domain positions do not overlap in the first slot;

decoding, by the user equipment user equipment, the some SPS PDSCHs;

wherein when determining, according to an SPS configuration index of each of the multiple SPS PDSCHs and a time domain position of each of the multiple SPS PDSCHs, some SPS PDSCHs whose time domain positions do not overlap in the first slot, the processor executes the program to implement:

taking the multiple SPS PDSCHs as a first set, or taking SPS PDSCHs that do not conflict with semi-statically configured uplink symbols, among the multiple SPS PDSCHs, as a first set;

and initializing an empty second set; performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap; adding remaining SPS PDSCHs in the first set to the second set, and taking SPS PDSCHs in the second set as the some SPS PDSCHs;

or, taking the multiple SPS PDSCHs as a first set, or taking SPS PDSCHs that do not conflict with semi-statically configured uplink symbols, among the multiple SPS PDSCHs, as a first set;

and initializing an empty third set; performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap; grouping each of remaining SPS PDSCHs in the updated first set into a group, and sorting each group in an ascending order of a smallest SPS configuration index in each group; according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set; taking SPS PDSCHs in the third set as the some SPS PDSCHs;

where in the some SPS PDSCHs at least include: an SPS PDSCH with a smallest SPS configuration index among the multiple SPS PDSCHs.

11. The user equipment according to claim 10, wherein the processor executes the program to implement:

in case that the user equipment is configured to use a dynamic HARQ-ACK codebook, or an HARQ-ACK codebook of the user equipment includes only feedback information of the SPS PDSCH correspond to an HARQ-ACK codebook, when it is determined to perform, in a feedback slot, HARQ-ACK feedback for the multiple SPS PDSCHs, generating HARQ-ACK feedback information according to the some SPS PDSCHs; and sending, in the feedback slot, an HARQ-ACK codebook including the HARQ-ACK feedback information corresponding to the some SPS PDSCHs.

12. A base station for performing the method according to claim 6, comprising: a memory, a processor, a transceiver, and a program stored on the memory and executable by the processor; wherein the processor executes the program to imple ment:

in case that multiple SPS PDSCHs are configured for a user equipment in a first slot, determining, according to an SPS configuration index of each of the multiple SPS PDSCHs and a time domain position of each of the multiple SPS PDSCHs, some SPS PDSCHs whose time domain positions do not overlap in the first slot;

sending the some SPS PDSCHs to the user equipment;

wherein when determining, according to an SPS configuration index of each of the multiple SPS PDSCHs and a time domain position of each of the multiple SPS PDSCHs, some SPS PDSCHs whose time domain positions do not overlap in the first slot, the processor executes the program to implement:

taking the multiple SPS PDSCHs as a first set, or taking SPS PDSCHs that do not conflict with semi-statically configured uplink symbols, among the multiple SPS PDSCHs, as a first set;

and initializing an empty second set; performing the following steps: determining a first SPS PDSCH with a smallest SPS configuration index from the first set, and adding the first SPS PDSCH to the second set; deleting the first SPS PDSCH from the first set, and deleting an SPS PDSCH whose time domain position overlaps the time domain position of the first SPS PDSCH, from the first set, thereby obtaining an updated first set; and continuing to perform the above steps on the updated first set until the first set does not include SPS PDSCHs whose time domain positions overlap; adding remaining SPS PDSCHs in the first set to the second set, and taking SPS PDSCHs in the second set as the some SPS PDSCHs;

or, taking the multiple SPS PDSCHs as a first set, or taking SPS PDSCHs that do not conflict with semi-statically configured uplink symbols, among the multiple SPS PDSCHs, as a first set;

and initializing an empty third set; performing the following steps: determining a second SPS PDSCH with an earliest end symbol position from the first set, grouping SPS PDSCHs in the first set, whose start symbol positions are earlier than the end symbol position of the second SPS PDSCH into a group, and deleting the SPS PDSCHs in the group from the first set to obtain an updated first set; and continuing to perform the above steps on the updated first set until the first set does not include SPS PDSCHs whose time domain positions overlap; grouping each of remaining SPS PDSCHs in the updated first set into a group, and sorting each group in an ascending order of a smallest SPS configuration index in each group; according to an order of each group, sequentially adding a candidate SPS PDSCH with a smallest SPS configuration index in each group to the third set, wherein the candidate SPS PDSCH in each group is an SPS PDSCH in each group, which does not have overlapping time domain positions with current SPS PDSCHs in the third set; taking SPS PDSCHs in the third set as the some SPS PDSCHs;

wherein the some SPS PDSCHs at least include: an SPS PDSCH with a smallest SPS configuration index among the multiple SPS PDSCHs.

* * * * *